US012627939B2

(12) United States Patent
Gao

(10) Patent No.: US 12,627,939 B2
(45) Date of Patent: May 12, 2026

(54) STEREO AUDIO SIGNAL PROCESSING METHOD, ENCODING DEVICE, AND STORAGE MEDIUM

(71) Applicant: BEIJING XIAOMI MOBILE SOFTWARE CO., LTD., Beijing (CN)

(72) Inventor: Shuo Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 190 days.

(21) Appl. No.: 18/715,679

(22) PCT Filed: Dec. 3, 2021

(86) PCT No.: PCT/CN2021/135514
§ 371 (c)(1),
(2) Date: May 31, 2024

(87) PCT Pub. No.: WO2023/097686
PCT Pub. Date: Jun. 8, 2023

(65) Prior Publication Data
US 2025/0024216 A1 Jan. 16, 2025

(51) Int. Cl.
*H04S 3/02* (2006.01)

(52) U.S. Cl.
CPC .................................... *H04S 3/02* (2013.01)

(58) Field of Classification Search
CPC ....... G10L 19/008; G10L 19/22; G10L 25/06; H04S 3/02; H04S 1/007; H04S 2420/03
USPC ........................................................ 381/20
See application file for complete search history.

(56) References Cited

U.S. PATENT DOCUMENTS

2020/0176000 A1* 6/2020 Li ........................ G10L 19/008

* cited by examiner

*Primary Examiner* — Paul Kim
(74) *Attorney, Agent, or Firm* — Cozen O'Connor

(57) ABSTRACT

A method for processing a stereo audio signal, performed by an encoding device, includes: determining an initial first threshold $Thresh0_1$ and an initial second threshold $Thresh0_2$ of a current frame of the stereo audio signal, where $Thresh0_1 \in (-1,0)$, and $Thresh0_2 \in (0,1)$; determining an offset value Delta; determining a first threshold Thresh1 and a second threshold Thresh2 corresponding to the current frame of the stereo audio signal according to a de-correlation manner for a previous frame of the stereo audio signal, the offset value Delta, the initial first threshold $Thresh0_1$ of the current frame, and the initial second threshold $Thresh0_2$ of the current frame; and performing de-correlation on the current frame according to the first threshold Thresh1 and the second threshold Thresh2 corresponding to the current frame.

18 Claims, 9 Drawing Sheets

STEREO AUDIO SIGNAL PROCESSING METHOD, ENCODING DEVICE, AND STORAGE MEDIUM

CROSS-REFERENCE TO RELATED APPLICATIONS

The present application is a U.S. national phase of International Application No. PCT/CN2021/135514, filed on Dec. 3, 2021, the entire disclosure of which is incorporated herein by reference for all purposes.

FIELD

The present disclosure relates to the field of communication technologies, and in particular to a stereo audio signal processing method, an encoding device and a storage medium.

BACKGROUND

Lossless encoding is widely applied due to its ability for realizing high-quality audio playback and lossless storage. When lossless encoding is performed on stereo audio signals, de-correlation is usually performed on the stereo audio signals, to improve the encoding compression rate.

In the related art, de-correlation is normally performed by setting a threshold, calculating a correlation coefficient for a left channel signal and a right channel signal of a current frame of a stereo audio signal, determining a correlation between the left channel signal and the right channel signal of the current frame based on the correlation coefficient and the threshold, and performing the de-correlation on the current frame by adopting an optimal de-correlation manner based on the determined correlation.

However, in the related art, the threshold corresponding to each frame of the stereo audio signal is fixed and cannot be updated adaptively, which will affect the accuracy of determining the correlation among different frames. In this way, it is hard to accurately select an optimal threshold for each frame, and improve the encoding compression rate.

SUMMARY

According to an aspect of the present disclosure, there is provided a method for processing a stereo audio signal, performed by an encoding device, including: determining an initial first threshold $Thresh0_1$ and an initial second threshold $Thresh0_2$ of a current frame of the stereo audio signal, where $Thresh0_1 \in (-1,0)$, and $Thresh0_2 \in (0,1)$; determining an offset value Delta; determining a first threshold Thresh1 and a second threshold Thresh2 corresponding to the current frame of the stereo audio signal according to a de-correlation manner for a previous frame of the stereo audio signal, the offset value Delta, the initial first threshold $Thresh0_1$ of the current frame, and the initial second threshold $Thresh0_2$ of the current frame; and performing de-correlation on the current frame according to the first threshold Thresh1 and the second threshold Thresh2 corresponding to the current frame.

According to a further aspect of the present disclosure, there is provided an encoding device, including: a processor; and a memory having stored therein a computer program that, when executed by the processor, causes the communication device to implement the method of embodiments of the above aspect.

According to a further aspect of the present disclosure, there is provided an encoding device, including: a processor and an interface circuit. The interface circuit is configured to receive a code instruction and transmit the code instruction to the processor. The processor is configured to run the code instruction to implement the method of embodiments of the above aspect.

According to a further aspect of the present disclosure, there is provided a non-transitory computer-readable storage medium having stored therein instructions that, when executed, cause the method of embodiments of the above aspect to be implemented.

BRIEF DESCRIPTION OF THE DRAWINGS

The above and/or additional aspects and advantages of the present disclosure will become apparent and more readily appreciated from the following descriptions made with reference to the drawings, in which.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of devices and methods consistent with some aspects of embodiments of the present disclosure as recited in the appended claims.

Terms used herein in embodiments of the present disclosure are only for the purpose of describing specific embodiments, but should not be construed to limit embodiments of the present disclosure. As used in embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

A method and apparatus for processing a stereo audio signal, an encoding device, a decoding device and a storage medium provided by embodiments of the present disclosure are described in detail below with reference to the accompanying drawings.

Figure 1A:
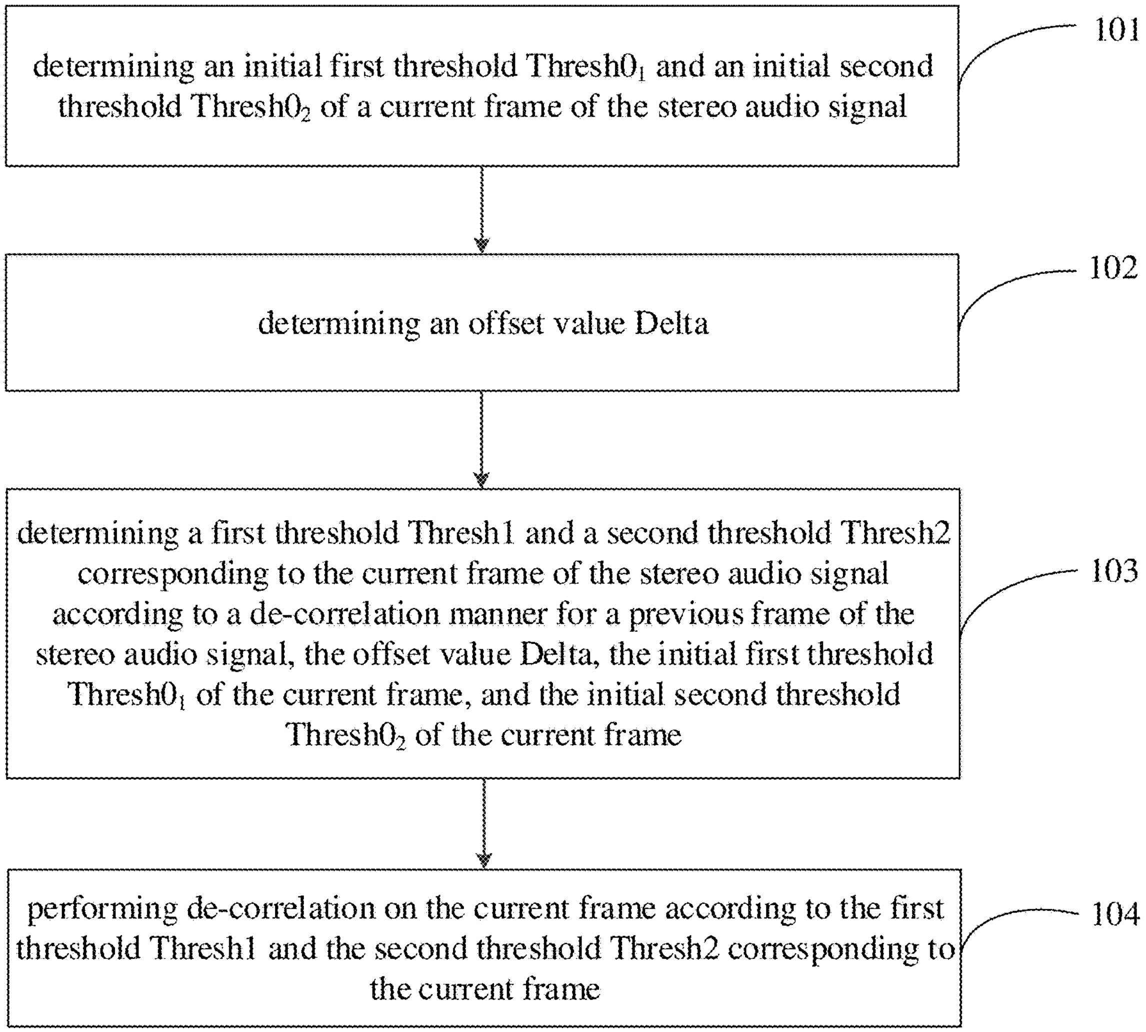
FIG. 1A is a flowchart of a method for processing a stereo audio signal provided by an embodiment of the present disclosure.

FIG. 1A is a flowchart of a method for processing a stereo audio signal provided by an embodiment of the present disclosure. The method is performed by an encoding device. As shown in FIG. 1A, the method or processing the stereo audio signal includes the following steps.

In step 101, an initial first threshold $Thresh0_1$ and an initial second threshold $Thresh0_2$ of a current frame of the stereo audio signal are determined, where $Thresh0_1 \in (-1, 0)$, and $Thresh0_2 \in (0, 1)$.

In an embodiment of the present disclosure, the current frame is any frame in the stereo audio signal except the first frame.

Further, in an embodiment of the present disclosure, the above-mentioned initial first threshold $Thresh0_1$ and initial second threshold $Thresh0_2$ may be preset, where the initial first threshold $Thresh0_1 \in (-1, 0)$, and the initial second threshold $Thresh0_2 \in (0, 1)$.

Further, in an embodiment of the present disclosure, the absolute value of the initial first threshold $Thresh0_1$ and the absolute value of the initial second threshold $Thresh0_2$ may be the same. In another embodiment of the present disclosure, the absolute value of the initial first threshold $Thresh0_1$ and the absolute value of the initial second threshold $Thresh0_2$ may be different. For example, in an embodiment of the present disclosure, the absolute value of the initial first threshold $Thresh0_1$ and the absolute value of the initial second threshold $Thresh0_2$ may both be 0.47, that is, the initial first threshold $Thresh0_1$ is −0.47, and the initial second threshold $Thresh0_2$ is 0.47. It can be understood that the above numerical value may be applied to any embodiment of the present disclosure, and the numerical value is only shown as an example, which is not limited by the present disclosure.

In addition, it should be noted that, in an embodiment of the present disclosure, the initial first threshold $Thresh0_1$ corresponding to each frame of the stereo audio signal is the same, and the initial second threshold $Thresh0_2$ corresponding to each frame of the stereo audio signal is the same.

In step 102, an offset value Delta is determined.

In an embodiment of the present disclosure, the determined offset value Delta has a specific function as follows. The offset value Delta is used to update the initial first threshold $Thresh0_1$ and the initial second threshold $Thresh0_2$ of the current frame to obtain the first threshold Thresh1 and the second threshold Thresh2 corresponding to the current frame. In an embodiment of the present disclosure, the offset value Delta includes an offset value Delta1 and an offset value Delta2, where the offset value Delta1 may be used to update the initial first threshold $Thresh0_1$ of the current frame and the offset value Delta2 may be used to update the initial second threshold $Thresh0_2$ of the current frame.

Further, in an embodiment of the present disclosure, determining the offset value Delta1 includes: making $Delta1 \in (0, |Thresh0_1|)$, and determining the offset value Delta2 includes: making $Delta2 \in (0, |Thresh0_2|)$. In an embodiment of the present disclosure, the offset value Delta1 and the offset value Delta2 are the same. In another embodiment of the present disclosure, the offset value Delta1 and the offset value Delta2 are different. For example, in an embodiment of the present disclosure, the offset values Delta1 and Delta2 are 0.05. It can be understood that the above numerical value can be applied to any embodiment of the present disclosure, and the numerical value is only shown as an example, which is not limited by the present disclosure.

In step 103, a first threshold Thresh1 and a second threshold Thresh2 corresponding to the current frame of the stereo audio signal are determined according to a de-correlation manner for a previous frame of the stereo audio signal, the offset value Delta, the initial first threshold $Thresh0_1$ of the current frame, and the initial second threshold $Thresh0_2$ of the current frame.

In an embodiment of the present disclosure, the first threshold Thresh1 and the second threshold Thresh2 corresponding to the current frame of the stereo audio signal are determined differently in responding to different ways for processing the previous frame. The detailed introduction of this part will be described in the following embodiments.

Further, in an embodiment of the present disclosure, the above-mentioned de-correlation manner for the previous frame may be determined according to a flag bit corresponding to the previous frame, where the flag bit of each frame is used to indicate a de-correlation manner for each frame. For example, in an embodiment of the present disclosure, the de-correlation manner for the previous frame is determined to be a first de-correlation manner in response to a flag bit 0 of the previous frame; the de-correlation manner for the previous frame is determined to be a second de-correlation manner in response to a flag bit 1 of the previous frame; and the de-correlation manner for the previous frame is determined to be not performing the de-correlation in response to a flag bit 2 of the previous frame. Detailed introductions about the first de-correlation manner, the second de-correlation manner, and not performing the de-correlation will be described in the following embodiments.

In step 104, de-correlation is performed on the current frame according to the first threshold Thresh1 and the second threshold Thresh2 corresponding to the current frame.

In an embodiment of the present disclosure, the first threshold Thresh1 corresponding to the current frame is specifically used to determine that the current frame is a near out of phase signal or an uncorrelated signal, and the second threshold Thresh2 is specifically used to determine that the current frame is a near in-phase signal or uncorrelated signal.

Further, in an embodiment of the present disclosure, performing the de-correlation on the current frame according to the first threshold Thresh1 and the second threshold Thresh2 corresponding to the current frame includes the following steps.

In step 1, the correlation of the current frame is determined according to the first threshold Thresh1 and the second threshold Thresh2 corresponding to the current frame, the correlation includes a near out of phase signal, a near in-phase signal and an uncorrelated signal.

Specifically, in an embodiment of the present disclosure, it is determined that the current frame is a near out of phase signal in response to determining that a cross-correlation coefficient for the left channel signal and the right channel signal of the current frame is smaller than the first threshold Thresh1 corresponding to the current frame; it is determined that the current frame is a near in-phase signal in response to determining that the cross-correlation coefficient for the left channel signal and the right channel signal of the current frame is greater than the second threshold Thresh2 corresponding to the current frame; and it is determined that the current frame is an uncorrelated signal in response to determining that the cross-correlation coefficient for the left channel signal and the right channel signal of the current frame is greater than or equal to the first threshold Thresh1 corresponding to the current frame and smaller than or equal to the second threshold Thresh2 corresponding to the current frame.

In step 2, an optimal de-correlation manner is selected according to the correlation of the current frame to perform the de-correlation on the current frame to obtain de-correlated signals.

Figure 1B:
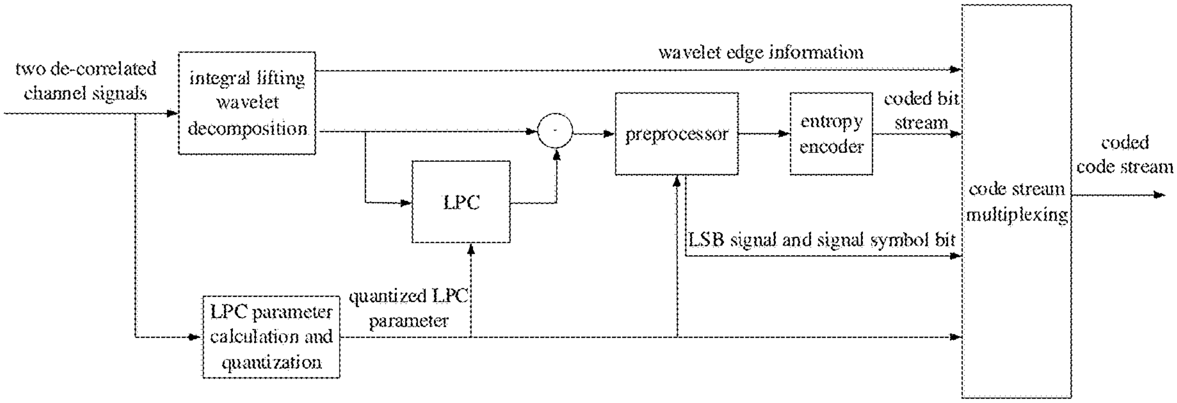
FIG. 1B is a block diagram illustrating a flow of obtaining an encoded code stream based on de-correlated signals provided by an embodiment of the present disclosure.

Further, in an embodiment of the present disclosure, after performing the de-correlation on the current frame to obtain the de-correlated signals (i.e., signals after the de-correlation), an encoded code stream may be obtained based on the signal after the de-correlation. In an embodiment of the present disclosure, FIG. 1B is a block diagram illustrating a flow of obtaining an encoded code stream based on a signal after de-correlation provided by an embodiment of the present disclosure. As shown in FIG. 1B, obtaining the encoded code stream based on the de-correlated signals includes the following steps.

The de-correlated signal is divided into sub-band signals by integral lifting wavelet decomposition, and the de-correlated signal is subjected to a linear prediction coefficient (LPC) parameter calculation and quantization to obtain a quantized LPC parameter. Each sub-band signal is processed by a linear predictor according to the quantized LPC parameter to generate a prediction residual signal. The prediction residual signal is normalized by a preprocessor to generate a normalized output signal, a least significant bit (LSB) signal and a signal symbol bit. Entropy encoding is performed, by an entropy encoder, on the normalized output signal corresponding to each sub-band signal to generate an encoded bit stream, and code stream multiplexing is performed on the encoded bit stream, the LSB signal, the signal symbol bit, the quantized LPC parameter, and wavelet edge information to obtain the encoded code stream.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 2:
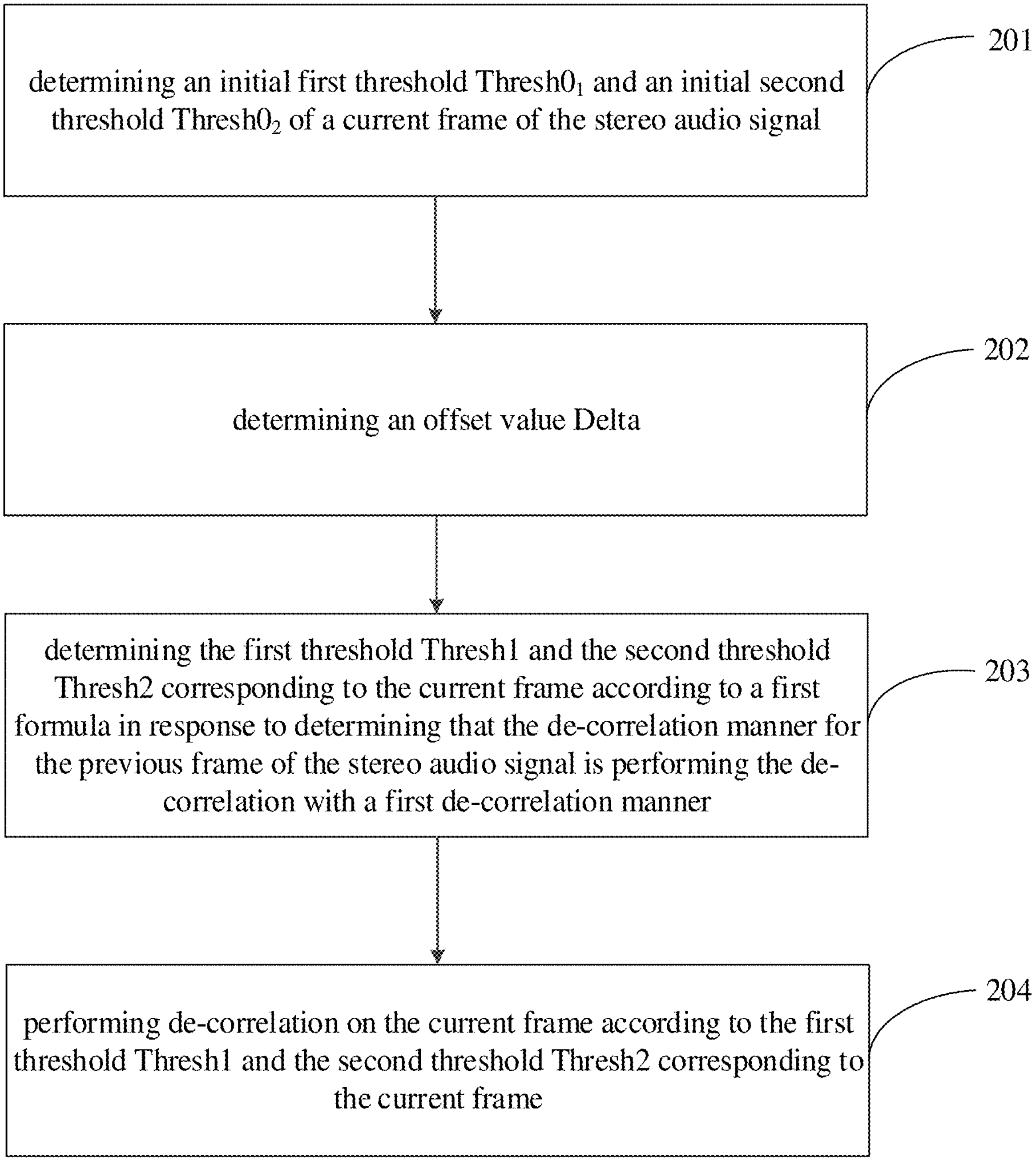
FIG. 2 is a flowchart of a method for processing a stereo audio signal provided by an embodiment of the present disclosure.

FIG. 2 is a flowchart of a method for processing a stereo audio signal provided by an embodiment of the present disclosure. The method is performed by the encoding device. As shown in FIG. 2, the method for processing the stereo audio signal includes the following steps.

In step 201, an initial first threshold $Thresh0_1$ and an initial second threshold $Thresh0_2$ of a current frame of the stereo audio signal are determined.

In step 202, an offset value Delta is determined.

For relevant introductions about steps 201-202, reference may be made to the descriptions of the foregoing embodiments, which will not be repeated here.

In step 203, the first threshold Thresh1 and the second threshold Thresh2 corresponding to the current frame are determined according to a first formula in response to determining that the de-correlation manner for the previous frame of the stereo audio signal is performing the de-correlation with a first de-correlation manner.

In an embodiment of the present disclosure, the first formula is $$\begin{cases} Thresh1 & = Thresh0_1 + \text{Delta} \\ Thresh2 & = Thresh0_2 \end{cases}$$

where Thresh1 and Thresh2 represent the first threshold and the second threshold of the current frame respectively, $Thresh0_1$ and $Thresh0_2$ represent an initial first threshold of the current frame and an initial second threshold of the current frame respectively, and Delta represents an offset value, and $\text{Delta} \in (\mathbf{0}, |Thresh0_1|)$ (that is, the offset value of this embodiment is specifically the offset value Delta1 used to update the initial first threshold $Thresh0_1$ of the current frame in the above embodiments).

The principle of determining the first threshold Thresh1 and the second threshold Thresh2 corresponding to the current frame by using the first formula is explained in detail as follows.

In an embodiment of the present disclosure, the first de-correlation manner may specifically be a manner for performing the de-correlation on the near out of phase signal. In an embodiment of the present disclosure, a process of determining whether to use the first de-correlation manner to perform the de-correlation on the previous frame includes: determining whether the previous frame is a near out of phase signal, and performing the de-correlation on the previous frame in the first de-correlation manner when the previous frame is the near out of phase signal, otherwise, the first de-correlation manner is not used to perform the de-correlation on the previous frame.

Further, in an embodiment of the present disclosure, the above-mentioned process of determining whether the previous frame is the near out of phase signal includes: calculating a first cross-correlation coefficient for a left channel signal and a right channel signal of the previous frame, determining that the previous frame is the near out of phase signal when the first cross-correlation coefficient is smaller than a first threshold $Thresh2_1$ corresponding to the previous frame, and determining that the first de-correlation needs to be performed on the signal.

However, it should be noted that, in an embodiment of the present disclosure, when determining whether the previous frame is the near out of phase signal only based on the first threshold $Thresh2_1$ corresponding to the previous frame and thus determining whether to perform the first de-correlation, the determination may be inaccurate due to inaccurate setting of the first threshold $Thresh2_1$ corresponding to the previous frame, resulting in the signal after the first de-correlation having a stronger correlation than that of the signal before the first de-correlation, and failure to realize a purpose of the de-correlation. Therefore, on the basis of determining that the first cross-correlation coefficient is smaller than the first threshold $Thresh2_1$ corresponding to the previous frame, whether the first cross-correlation coefficient is smaller than a second cross-correlation coefficient may be further determined. The second cross-correlation coefficient is a cross-correlation coefficient for the signal after the de-correlation, which is obtained by performing the first de-correlation on the signal of the previous frame with the first de-correlation manner.

In an embodiment of the present disclosure, when the first cross-correlation coefficient is smaller than the second cross-correlation coefficient, it indicates that "a result of determining whether the previous frame is subjected to the first de-correlation according to the first threshold $Thresh2_1$ corresponding to the previous frame is accurate". In other words, it shows that the first threshold $Thresh2_1$ corresponding to the previous frame is set accurately, and the purpose of de-correlation may be achieved after the near out of phase signal identified based on the first threshold $Thresh2_1$ is subjected to the first de-correlation. However, the first threshold $Thresh2_1$ may still not reach a critical point of determining whether the de-correlation is required, that is, it is still possible to increase the first threshold $Thresh2_1$, so that after the near out of phase signal identified by the increased threshold is subjected to the first de-correlation, the first cross-correlation coefficient is still smaller than the second cross-correlation coefficient, that is, the purpose of the de-correlation can still be achieved.

On this basis, it should also be noted that, in an embodiment of the present disclosure, if the de-correlation manner of the previous frame is adopting the first de-correlation manner to perform the de-correlation, it means that the previous frame is the near out of phase signal, and the first threshold $Thresh2_1$ for the previous frame may still be increased, and since the first threshold $Thresh2_1$ corresponding to the previous frame is determined according to the initial first threshold $Thresh0_1$, it may be obtained that the initial first threshold $Thresh0_1$ for the previous frame may still be increased. At this time, for the current frame, the initial first threshold $Thresh0_1$ may be updated based on the offset value Delta to obtain the first threshold Thresh1 corresponding to the current frame, that is, $Thresh1=Thresh0_1+Delta$, and the current frame signal is de-correlated according to the first threshold Thresh1, resulting in an improved de-correlation effect.

Further, in an embodiment of the present disclosure, the de-correlation manner of the previous frame is adopting the first de-correlation manner to perform the de-correlation, it means that the previous frame is the near out of phase signal. On this basis, since a second threshold $Thresh2_2$ corresponding to the previous frame is not used for determining whether the previous frame is the near out of phase signal, but for determining whether the previous frame is an uncorrelated signal or a near in-phase signal, it is not necessary to update the initial second threshold $Thresh0_2$, and the initial second threshold $Thresh0_2$ may be determined as the second threshold Thresh2 corresponding to the current frame directly, that is, $Thresh2=Thresh0_2$.

In addition, it should be noted that the above-mentioned first de-correlation manner may include a first Mid/Sid down-mixing processing.

Specifically, in an embodiment of the present disclosure, the first Mid/Sid down-mixing processing includes: obtaining a Mid-channel signal and a Sid-channel signal by processing the left channel signal and the right channel signal of the previous frame according to a sixth formula, where the sixth formula is:

$$\begin{cases} Mid(n) & = \frac{(L(n)-R(n))}{2} \\ Sid(n) & = L(n)+R(n) \end{cases}$$

where Mid(n) represents a Mid-channel signal of the previous frame, Sid(n) represents a Sid-channel signal of the previous frame, L(n) represents the left channel signal of the previous frame, and R(n) represents the right channel signal of the previous frame.

In an embodiment of the present disclosure, the method for determining the above-mentioned first cross-correlation coefficient includes: determining the first cross-correlation coefficient for the left channel signal and the right channel signal of the previous frame according to an eighth formula of $$\begin{cases} \eta_{(LR)} & = \frac{\sum_{n=1}^{N}(L(n)-\bar{L})\times(R(n)-\bar{R})}{\sqrt{\sum_{n=1}^{N}(L(n)-\bar{L})^2}\times\sqrt{\sum_{n=1}^{N}(R(n)-\bar{R})^2}} \\ \bar{L} = \frac{\sum_{n=1}^{N}L(n)}{N} \\ \bar{R} = \frac{\sum_{n=1}^{N}R(n)}{N} \end{cases}$$

where $\eta_{(LR)}$ represents the cross-correlation coefficient for the left channel signal and the right channel signal of the previous frame, L(n) represents a $n^{th}$ sample point of the left channel signal of the previous frame, $\bar{L}$ represents an average value of all sample points of the left channel signal of the previous frame, R(n) represents a $n^{th}$ sample point of the right channel signal of the previous frame, $\bar{R}$ represents an average value of all sample points of the right channel signal of the previous frame, N represents a total number of sample points of the left channel signal or the right channel signal of the previous frame, i.e., a frame length of the previous frame.

In an embodiment of the present disclosure, the method for determining the above-mentioned second cross-correlation coefficient includes: determining the second cross-correlation coefficient according to a ninth formula of $$\begin{cases} \eta_{(MS)} = \dfrac{\sum_{n=1}^{N}\left(Mid(n)-\overline{Mid}\right)\times\left(Sid(n)-\overline{Sid}\right)}{\sqrt{\sum_{n=1}^{N}\left(Mid(n)-\overline{Mid}\right)^2}\times\sqrt{\sum_{n=1}^{N}\left(Sid(n)-\overline{Sid}\right)^2}} \\ \overline{Mid} = \dfrac{\sum_{n=1}^{N} Mid(n)}{N} \\ \overline{Sid} = \dfrac{\sum_{n=1}^{N} Sid(n)}{N} \end{cases}$$

where $\eta_{(MS)}$ represents the second cross-correlation coefficient, Mid(n) represents a $n^{th}$ sample point of the Mid-channel signal in the signal after the de-correlation, $\overline{Mid}$ represents an average value of all sample points of the Mid-channel signal in the signal after the de-correlation, Sid(n) represents a $n^{th}$ sample point of the Sid-channel signal in the signal after the de-correlation, $\overline{Sid}$ represents an average value of all sample points of the Sid-channel signal in the signal after the de-correlation, N represents a total number of sample points of the Mid-channel signal or the Sid-channel signal of the previous frame, i.e., a frame length of the previous frame.

In step 204, de-correlation is performed on the current frame according to the first threshold Thresh1 and the second threshold Thresh2 corresponding to the current frame.

For the relevant introduction about step 204, reference may be made to the descriptions of the foregoing embodiments, which will not be repeated here.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 3:
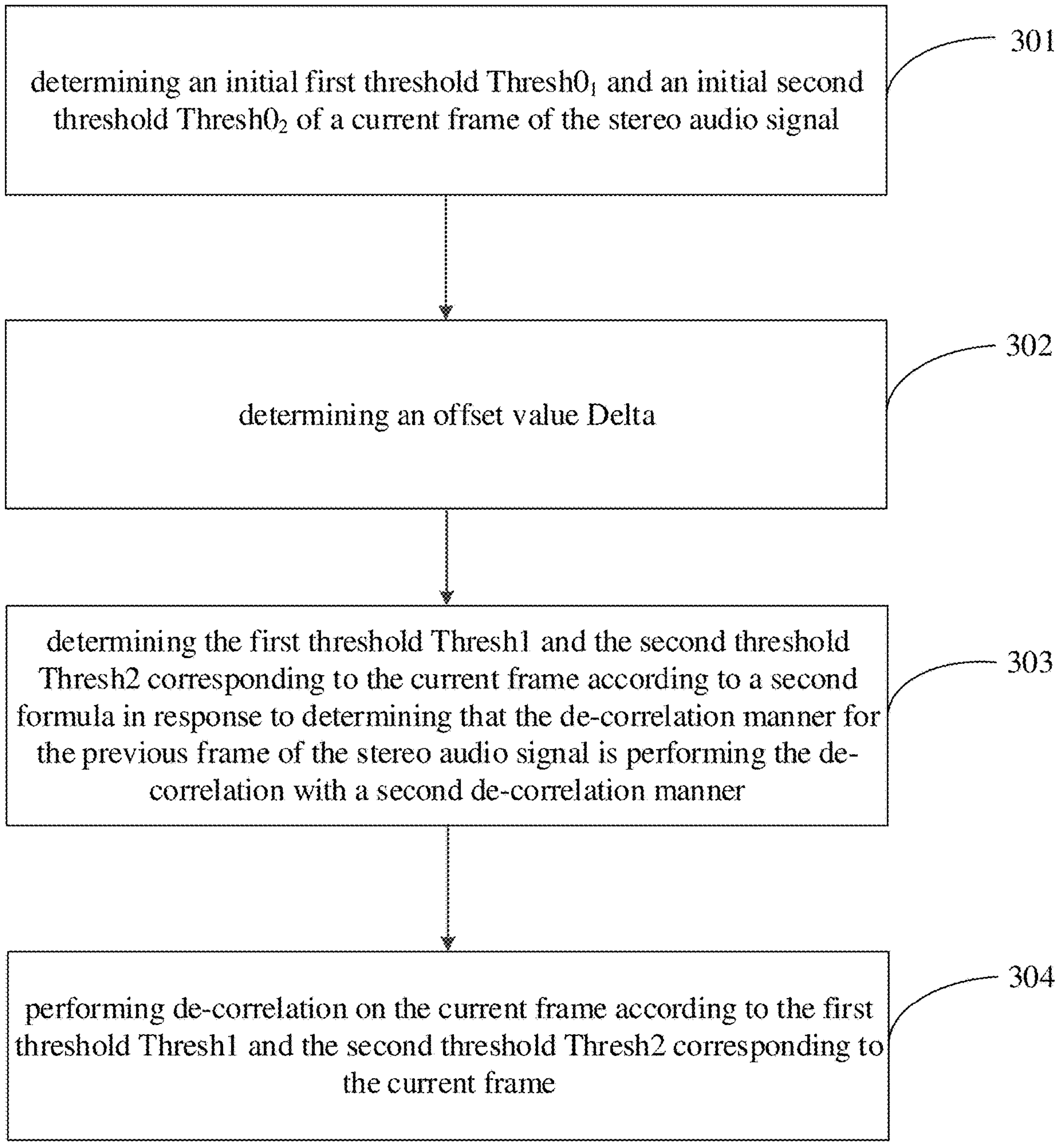
FIG. 3 is a flowchart of a method for processing a stereo audio signal provided by an embodiment of the present disclosure.

FIG. 3 is a flowchart of a method for processing a stereo audio signal provided by an embodiment of the present disclosure. The method is performed by the encoding device. As shown in FIG. 3, the method for processing the stereo audio signal includes the following steps.

In step 301, an initial first threshold $Thresh0_1$ and an initial second threshold $Thresh0_2$ of a current frame of the stereo audio signal are determined.

In step 302, an offset value Delta is determined.

For relevant introductions about steps 301-302, reference may be made to the descriptions of the foregoing embodiments, which will not be repeated here.

In step 303, the first threshold Thresh1 and the second threshold Thresh2 corresponding to the current frame are determined according to a second formula in response to determining that the de-correlation manner for the previous frame of the stereo audio signal is performing the de-correlation with a second de-correlation manner.

In an embodiment of the present disclosure, the second formula is $$\begin{cases} Thresh1 = Thresh0_1 \\ Thresh2 = Thresh0_2 - \text{Delta} \end{cases}$$

where Thresh1 and Thresh2 represent a first threshold of the current frame and a second threshold of the current frame respectively, $Thresh0_1$ and $Thresh0_2$ represent an initial first threshold of the current frame and an initial second threshold of the current frame respectively, and Delta represents an offset value, and $\text{Delta} \in (0, |Thresh0_2|)$ (that is, the offset value of this embodiment is specifically the offset value Delta2 used to update the initial second threshold $Thresh0_2$ of the current frame in the above embodiments).

The principle of determining the first threshold Thresh1 and the second threshold Thresh2 corresponding to the current frame by using the second formula is explained in detail as follows.

In an embodiment of the present disclosure, the second de-correlation manner may specifically be a manner for performing the de-correlation on the near in-phase signal. In an embodiment of the present disclosure, a process of determining whether to use the second de-correlation manner to perform the de-correlation on the previous frame includes: determining whether the previous frame is a near in-phase signal, and performing the de-correlation on the previous frame in the second de-correlation manner when the previous frame is the near in-phase signal, otherwise, the second de-correlation manner is not used to perform the de-correlation on the previous frame.

Further, in an embodiment of the present disclosure, the above-mentioned process of determining whether the previous frame is the near in-phase signal includes: calculating a first cross-correlation coefficient for a left channel signal and a right channel signal of the previous frame, determining that the previous frame is the near in-phase signal when the first cross-correlation coefficient is greater than a second threshold $Thresh2_2$ corresponding to the previous frame, and determining that the second de-correlation needs to be performed on the signal.

However, it should be noted that, in an embodiment of the present disclosure, when determining whether the previous frame is the near in-phase signal only based on the second threshold $Thresh2_2$ corresponding to the previous frame and thus determining whether to perform the second de-correlation, the determination may be inaccurate due to inaccurate setting of the second threshold $Thresh2_2$ corresponding to the previous frame, resulting in the signal after the second de-correlation having a stronger correlation than that of the signal before the first de-correlation, and failure to realize a purpose of the de-correlation. Therefore, on the basis of determining that the first cross-correlation coefficient is greater than the second threshold $Thresh2_2$ corresponding to the previous frame, whether the first cross-correlation coefficient is greater than a third cross-correlation coefficient may be further determined. The third cross-correlation coefficient is a cross-correlation coefficient for the signal after the de-correlation, which is obtained by performing the second de-correlation on the signal of the previous frame with the second de-correlation manner.

In an embodiment of the present disclosure, when the first cross-correlation coefficient is greater than the third cross-correlation coefficient, it indicates that "a result of determining whether the previous frame is subjected to the second de-correlation according to the second threshold $Thresh2_2$ corresponding to the previous frame is accurate". In other words, it shows that the second threshold $Thresh2_2$ corresponding to the previous frame is set accurately, and the purpose of de-correlation may be achieved after the near in-phase signal identified based on the second threshold $Thresh2_2$ is subjected to the second de-correlation. However, the second threshold $Thresh2_2$ may still not reach a critical point of determining whether the de-correlation is required, that is, it is still possible to decrease the second threshold $Thresh2_1$, so that after the near in-phase signal identified by the decreased threshold is subjected to the second de-correlation, the first cross-correlation coefficient is still greater than the third cross-correlation coefficient, that is, the purpose of the de-correlation can still be achieved.

On this basis, it should also be noted that, in an embodiment of the present disclosure, if the de-correlation manner of the previous frame is adopting the second de-correlation manner to perform the de-correlation, it means that the previous frame is the near in-phase signal, and the second threshold $Thresh2_2$ for the previous frame may still be decreased, and since the second threshold $Thresh2_2$ corresponding to the previous frame is determined according to the initial second threshold $Thresh0_2$, it may be obtained that the initial second threshold $Thresh0_2$ for the previous frame may still be decreased. At this time, for the current frame, the initial second threshold $Thresh0_2$ may be updated based on the offset value Delta to obtain the second threshold Thresh2 corresponding to the current frame, that is, $Thresh2=Thresh0_2-Delta$, and the current frame signal is de-correlated according to the second threshold Thresh2, resulting in an improved de-correlation effect.

Further, in an embodiment of the present disclosure, the de-correlation manner of the previous frame is adopting the second de-correlation manner to perform the de-correlation, it means that the previous frame is the near in-phase signal. On this basis, since the first threshold $Thresh2_1$ corresponding to the previous frame is not used for determining whether the previous frame is the near in-phase signal, but for determining whether the previous frame is an uncorrelated signal or a near out of phase signal, it is not necessary to update the initial first threshold $Thresh0_1$, and the initial first threshold $Thresh0_1$ may be determined as the first threshold Thresh1 corresponding to the current frame directly, that is, $Thresh1=Thresh0_1$.

In addition, it should be noted that the above-mentioned second de-correlation manner may include a second Mid/Sid down-mixing processing.

Specifically, in an embodiment of the present disclosure, the second Mid/Sid down-mixing processing includes: obtaining a Mid-channel signal and a Sid-channel signal by processing the left channel signal and the right channel signal of the previous frame according to a seventh formula, where the seventh formula is:

$$\begin{cases} Mid(n) &= \dfrac{(L(n)+R(n))}{2} \\ Sid(n) &= L(n)-R(n) \end{cases}$$

where Mid(n) represents a Mid-channel signal of the previous frame, Sid(n) represents a Sid-channel signal of the previous frame, L(n) represents the left channel signal of the previous frame, and R(n) represents the right channel signal of the previous frame.

The determination of the first cross-correlation coefficient may be referred to the description of the above embodiments which are not repeated here.

In an embodiment of the present disclosure, determining the third cross-correlation coefficient includes: determining the third cross-correlation coefficient according to a ninth formula of $$\begin{cases} \eta_{(MS)} = \dfrac{\sum_{n=1}^{N}\left(Mid(n)-\overline{Mid}\right)\times\left(Sid(n)-\overline{Sid}\right)}{\sqrt{\sum_{n=1}^{N}\left(Mid(n)-\overline{Mid}\right)^2}\times\sqrt{\sum_{n=1}^{N}\left(Sid(n)-\overline{Sid}\right)^2}} \\ \overline{Mid} = \dfrac{\sum_{n=1}^{N} Mid(n)}{N} \\ \overline{Sid} = \dfrac{\sum_{n=1}^{N} Sid(n)}{N} \end{cases}$$

where $\eta_{(MS)}$ represents the third cross-correlation coefficient, Mid(n) represents a $n^{th}$ sample point of the Mid-channel signal in the signal after the de-correlation, $\overline{Mid}$ represents an average value of all sample points of the Mid-channel signal in the signal after the de-correlation, Sid(n) represents a $n^{th}$ sample point of the Sid-channel signal in the signal after the de-correlation, $\overline{Sid}$ represents an average value of all sample points of the Sid-channel signal in the signal after the de-correlation, N represents a total number of sample points of the Mid-channel signal or the Sid-channel signal of the previous frame, i.e., a frame length of the previous frame.

In step 304, de-correlation is performed on the current frame according to the first threshold Thresh1 and the second threshold Thresh2 corresponding to the current frame.

For the relevant introduction about step 304, reference may be made to the descriptions of the foregoing embodiments, which will not be repeated here.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1\in(-1, 0)$, $Thresh0_2\in(0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 4:
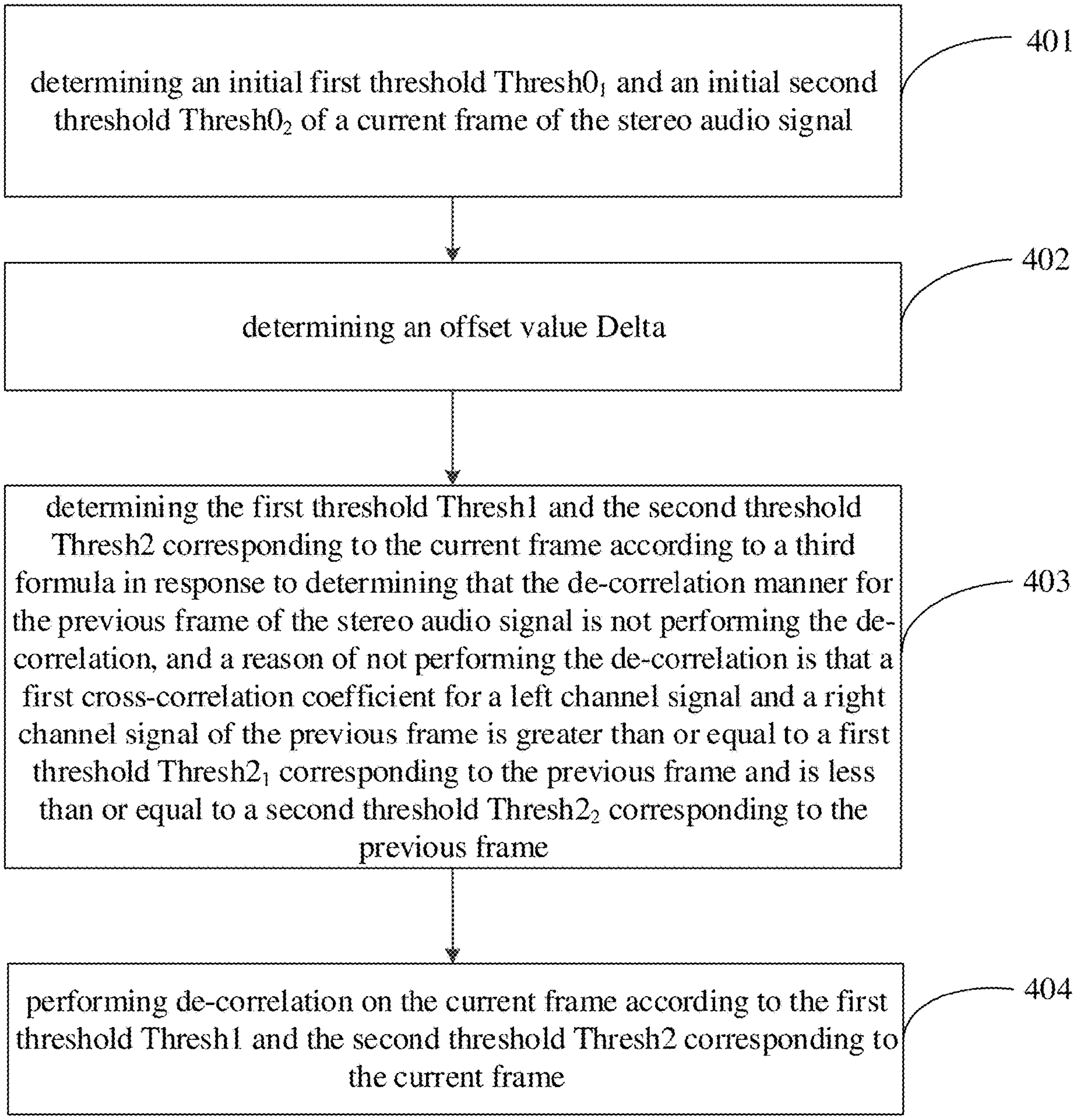
FIG. 4 is a flowchart of a method for processing a stereo audio signal provided by an embodiment of the present disclosure.

FIG. 4 is a flowchart of a method for processing a stereo audio signal provided by an embodiment of the present disclosure. The method is performed by the encoding device. As shown in FIG. 4, the method for processing the stereo audio signal includes the following steps.

In step 401, an initial first threshold $Thresh0_1$ and an initial second threshold $Thresh0_2$ of a current frame of the stereo audio signal are determined.

In step 402, an offset value Delta is determined.

For relevant introductions about steps 401-402, reference may be made to the descriptions of the foregoing embodiments, which will not be repeated here.

In step 403, the first threshold Thresh1 and the second threshold Thresh2 corresponding to the current frame are determined according to a third formula in response to determining that the de-correlation manner for the previous frame of the stereo audio signal is not performing the de-correlation, and a reason of not performing the de-correlation is that a first cross-correlation coefficient for a left channel signal and a right channel signal of the previous frame is greater than or equal to a first threshold $Thresh2_1$ corresponding to the previous frame and is smaller than or equal to a second threshold $Thresh2_2$ corresponding to the previous frame.

In an embodiment of the present disclosure, the third formula is:

$$\begin{cases} Thresh1 = Thresh0_1 \\ Thresh2 = Thresh0_2 \end{cases}$$

where Thresh1 and Thresh2 represent a first threshold of the current frame and a second threshold of the current frame respectively, $Thresh0_1$ and $Thresh0_2$ represent an initial first threshold of the current frame and an initial second threshold of the current frame respectively.

In an embodiment of the present disclosure, when the first cross-correlation coefficient for the left channel signal and the right channel signal of the previous frame is greater than or equal to the first threshold $Thresh2_1$ corresponding to the previous frame and is smaller than or equal to the second threshold $Thresh2_2$ corresponding to the previous frame, it indicates that the previous frame is an uncorrelated signal, and it is not necessary to update the first threshold Thresh1 and the second threshold Thresh2 of the current frame.

In step 404, de-correlation is performed on the current frame according to the first threshold Thresh1 and the second threshold Thresh2 corresponding to the current frame.

For the relevant introduction about step 404, reference may be made to the descriptions of the foregoing embodiments, which will not be repeated here.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 5:
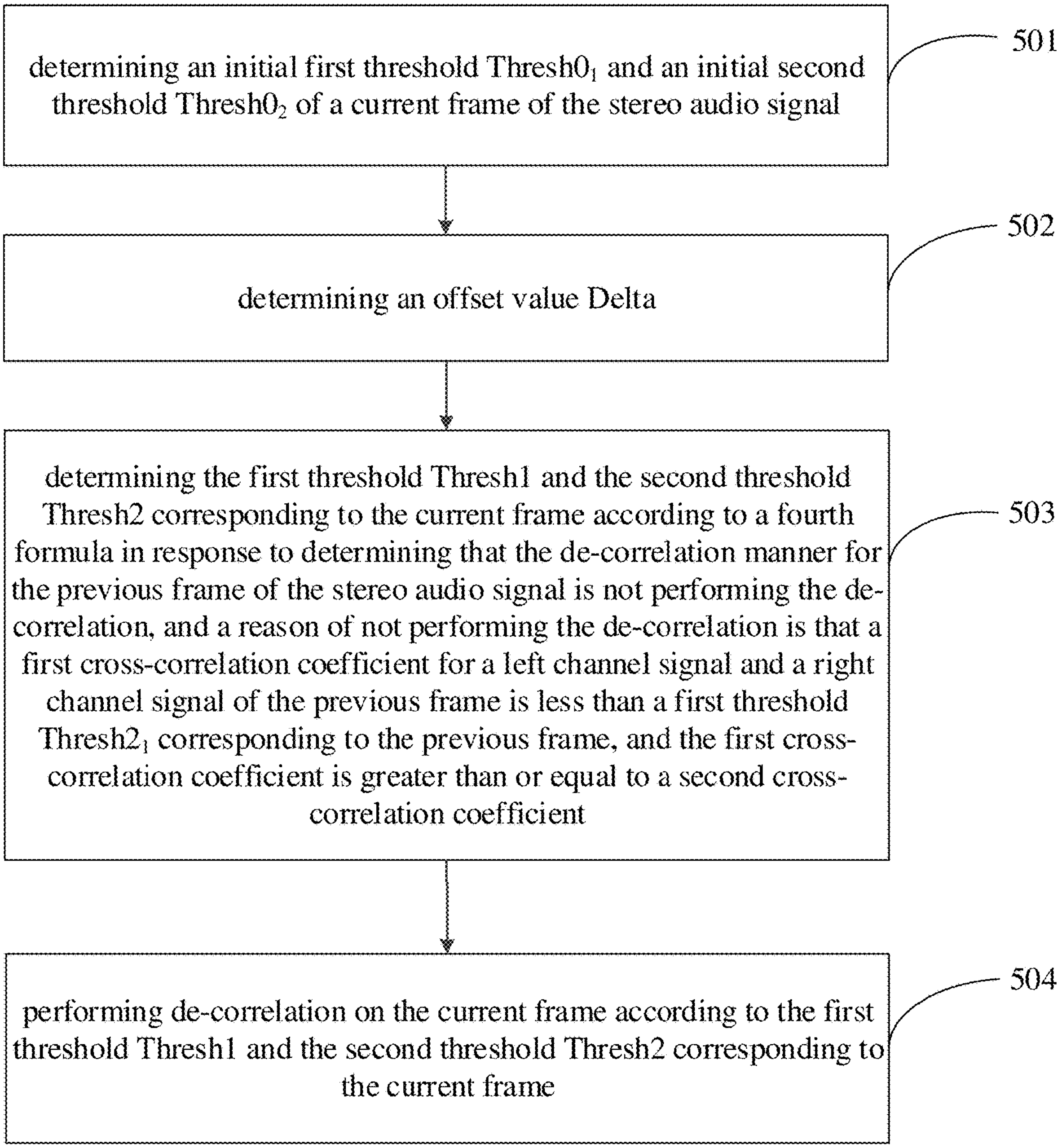
FIG. 5 is a flowchart of a method for processing a stereo audio signal provided by an embodiment of the present disclosure.

FIG. 5 is a flowchart of a method for processing a stereo audio signal provided by an embodiment of the present disclosure. The method is performed by the encoding device. As shown in FIG. 5, the method for processing the stereo audio signal includes the following steps.

In step 501, an initial first threshold $Thresh0_1$ and an initial second threshold $Thresh0_2$ of a current frame of the stereo audio signal are determined.

In step 502, an offset value Delta is determined.

For relevant introductions about steps 501-502, reference may be made to the descriptions of the foregoing embodiments, which will not be repeated here.

In step 503, the first threshold Thresh1 and the second threshold Thresh2 corresponding to the current frame are determined according to a fourth formula in response to determining that the de-correlation manner for the previous frame of the stereo audio signal is not performing the de-correlation, and a reason of not performing the de-correlation is that a first cross-correlation coefficient for a left channel signal and a right channel signal of the previous frame is smaller than a first threshold $Thresh2_1$ corresponding to the previous frame, and the first cross-correlation coefficient is greater than or equal to a second cross-correlation coefficient.

In an embodiment of the present disclosure, the fourth formula is $$\begin{cases} Thresh1 = Thresh0_1 - \text{Delta} \\ Thresh2 = Thresh0_2 \end{cases}$$

where Thresh1 and Thresh2 represent a first threshold of the current frame and a second threshold of the current frame respectively, $Thresh0_1$ and $Thresh0_2$ represent an initial first threshold of the current frame and an initial second threshold of the current frame respectively, and Delta represents an offset value, and $\text{Delta} \in (0, |Thresh0_1|)$ (that is, the offset value of this embodiment is specifically the offset value Delta1 used to update the initial first threshold $Thresh0_1$ of the current frame in the above embodiments).

In an embodiment of the present disclosure, the second cross-correlation coefficient is a cross-correlation coefficient for a signal obtained, after the de-correlation, by performing a first de-correlation on a signal of the previous frame with a first de-correlation manner.

The principle of determining the first threshold Thresh1 and the second threshold Thresh2 corresponding to the current frame according to the fourth formula is explained in detail as follows. When the first cross-correlation coefficient is greater than or equal to the second cross-correlation coefficient, it indicates that the previous frame has not been subjected to the de-correlation, meaning that "a result of determining, according to the first threshold $Thresh2_1$ corresponding to the previous frame, that the previous frame is the near out of phase signal and thus performing the first de-correlation is inaccurate". In other words, it indicates that a value of the first threshold $Thresh2_1$ corresponding to the previous frame is taken inaccurately, and the purpose of the de-correlation is not achieved after the signal identified according to the first threshold $Thresh2_1$ is subjected to the first de-correlation, and it is considered that the first threshold $Thresh2_1$ is greater than the critical point of the threshold for determining whether the de-correlation is required. That is, the first threshold $Thresh2_1$ needs to be decreased, so that after the near out of phase signal identified by the decreased threshold is subjected to the first de-correlation, the first cross-correlation coefficient is smaller than the second cross-correlation coefficient, that is, the purpose of the de-correlation is realized.

In an embodiment of the present disclosure, as known from the above description, if the first cross-correlation coefficient for the left channel signal and the right channel signal of the previous frame is smaller than the first threshold $Thresh2_1$ corresponding to the previous frame, and the first cross-correlation coefficient is greater than or equal to the second cross-correlation coefficient, it indicates that it is considered that the first threshold $Thresh2_1$ is greater than the critical point of the threshold for determining whether the de-correlation is required, and since the first threshold $Thresh2_1$ corresponding to the previous frame is determined according to the initial first threshold $Thresh0_1$, it is concluded that the initial first threshold $Thresh0_1$ may also be greater than the critical point of the threshold for determining whether the de-correlation is required. At this time, the initial first threshold $Thresh0_1$ may be updated based on the offset value Delta to obtain the first threshold Thresh1 corresponding to the current frame, that is, $Thresh1=Thresh0_1-Delta$, and the current frame signal is de-correlated according to the first threshold Thresh1, resulting in an improved de-correlation effect.

Further, in an embodiment of the present disclosure, the fact that "the first cross-correlation coefficient for the left channel signal and the right channel signal of the previous frame is smaller than the first threshold $Thresh2_1$ corresponding to the previous frame, and the first cross-correlation coefficient is greater than or equal to the second cross-correlation coefficient" indicates that "a result of determining, according to the first threshold $Thresh2_1$ corresponding to the previous frame, that the previous frame is the near out of phase signal is inaccurate". On this basis, since the second threshold $Thresh2_2$ corresponding to the previous frame is not used for determining whether the previous frame is the near out of phase signal, but for determining whether the previous frame is an uncorrelated signal or a near in-phase signal, it is not necessary to update the initial second threshold $Thresh0_2$, and the initial second threshold $Thresh0_2$ may be determined as the second threshold Thresh2 corresponding to the current frame directly, that is, $Thresh2=Thresh0_2$.

In addition, the relevant introductions of the first de-correlation manner, the first cross-correlation coefficient, and the second cross-correlation coefficient may be referred to the description of the above-mentioned embodiments which will not be repeated here.

In step 504, de-correlation is performed on the current frame according to the first threshold Thresh1 and the second threshold Thresh2 corresponding to the current frame.

For the relevant introduction about step 504, reference may be made to the descriptions of the foregoing embodiments, which will not be repeated here.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 6:
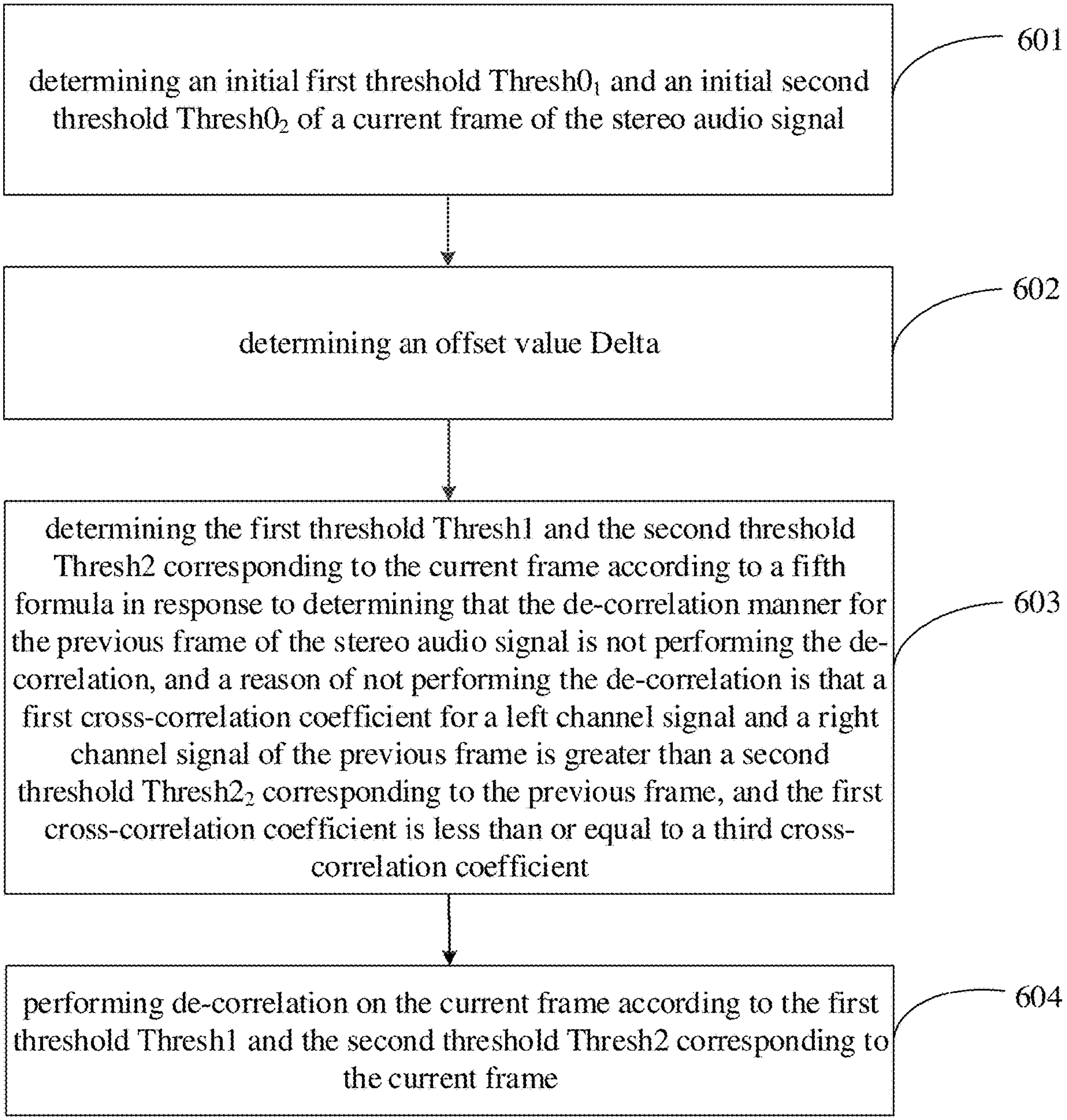
FIG. 6 is a flowchart of a method for processing a stereo audio signal provided by an embodiment of the present disclosure.

FIG. 6 is a flowchart of a method for processing a stereo audio signal provided by an embodiment of the present disclosure. The method is performed by the encoding device. As shown in FIG. 6, the method for processing the stereo audio signal includes the following steps.

In step 601, an initial first threshold $Thresh0_1$ and an initial second threshold $Thresh0_2$ of a current frame of the stereo audio signal are determined.

In step 602, an offset value Delta is determined.

For relevant introductions about steps 601-602, reference may be made to the descriptions of the foregoing embodiments, which will not be repeated here.

In step 603, the first threshold Thresh1 and the second threshold Thresh2 corresponding to the current frame are determined according to a fifth formula in response to determining that the de-correlation manner for the previous frame of the stereo audio signal is not performing the de-correlation, and a reason of not performing the de-correlation is that a first cross-correlation coefficient for a left channel signal and a right channel signal of the previous frame is greater than a second threshold $Thresh2_2$ corresponding to the previous frame, and the first cross-correlation coefficient is smaller than or equal to a third cross-correlation coefficient.

In an embodiment of the present disclosure, the fifth formula is $$\begin{cases} Thresh1 = Thresh0_1 \\ Thresh2 = Thresh0_2 - \text{Delta} \end{cases}$$

where Thresh1 and Thresh2 represent a first threshold of the current frame and a second threshold of the current frame respectively, $Thresh0_1$ and $Thresh0_2$ represent an initial first threshold of the current frame and an initial second threshold of the current frame respectively, and Delta represents an offset value, and $\text{Delta} \in (0, |Thresh0_2|)$ (that is, the offset value of this embodiment is specifically the offset value Delta2 used to update the initial second threshold $Thresh0_2$ of the current frame in the above embodiments).

In an embodiment of the present disclosure, the third cross-correlation coefficient is a cross-correlation coefficient for a signal obtained, after the de-correlation, by performing a second de-correlation on a signal of the previous frame with a second de-correlation manner.

The principle of determining the first threshold Thresh1 and the second threshold Thresh2 corresponding to the current frame according to the fifth formula is explained in detail as follows. When the first cross-correlation coefficient is smaller than or equal to the third cross-correlation coefficient, it indicates that the previous frame has not been subjected to the de-correlation, meaning that "a result of determining, according to the second threshold $Thresh2_2$ corresponding to the previous frame, that the previous frame is the near in-phase signal and thus performing the second de-correlation is inaccurate". In other words, it indicates that a value of the second threshold $Thresh2_2$ corresponding to the previous frame is taken inaccurately, and the purpose of the de-correlation is not achieved after the signal identified according to the second threshold $Thresh2_2$ is subjected to the second de-correlation, and it is considered that the second threshold $Thresh2_2$ is smaller than the critical point of the threshold for determining whether the de-correlation is required. That is, the second threshold $Thresh2_2$ needs to be increased, so that after the near in-phase signal identified by the increased threshold is subjected to the second de-correlation, the first cross-correlation coefficient is greater than the third cross-correlation coefficient, that is, the purpose of the de-correlation is realized.

In an embodiment of the present disclosure, as known from the above description, if the first cross-correlation coefficient for the left channel signal and the right channel signal of the previous frame is greater than the second threshold $Thresh2_2$ corresponding to the previous frame, and the first cross-correlation coefficient is smaller than or equal to the third cross-correlation coefficient, it indicates that it is considered that the second threshold $Thresh2_2$ is smaller than the critical point of the threshold for determining whether the de-correlation is required, and since the second threshold $Thresh2_2$ corresponding to the previous frame is determined according to the initial second threshold $Thresh0_2$, it is concluded that the initial second threshold $Thresh0_2$ may also be smaller than the critical point of the threshold for determining whether the de-correlation is required. At this time, the initial second threshold $Thresh0_2$ may be updated based on the offset value Delta to obtain the second threshold Thresh2 corresponding to the current frame, that is, $Thresh2=Thresh0_2+Delta$, and the current frame signal is de-correlated according to the second threshold Thresh2, resulting in an improved de-correlation effect.

Further, in an embodiment of the present disclosure, the fact that "the first cross-correlation coefficient for the left channel signal and the right channel signal of the previous frame is greater than the second threshold $Thresh2_2$ corresponding to the previous frame, and the first cross-correlation coefficient is smaller than or equal to the third cross-correlation coefficient" indicates that "a result of determining, according to the second threshold $Thresh2_2$ corresponding to the previous frame, that the previous frame is the near in-phase signal is inaccurate". On this basis, since the first threshold $Thresh2_1$ corresponding to the previous frame is not used for determining whether the previous frame is the near in-phase signal, but for determining whether the previous frame is an uncorrelated signal or a near out of phase signal, it is not necessary to update the initial first threshold $Thresh0_1$, and the initial first threshold $Thresh0_1$ may be determined as the first threshold Thresh1 corresponding to the current frame directly, that is, $Thresh1=Thresh0_1$.

In addition, the relevant introductions of the second de-correlation manner, the first cross-correlation coefficient, and the third cross-correlation coefficient may be referred to the description of the above-mentioned embodiments, which will not be repeated here.

In step 604, de-correlation is performed on the current frame according to the first threshold Thresh1 and the second threshold Thresh2 corresponding to the current frame.

For the relevant introduction about step 604, reference may be made to the descriptions of the foregoing embodiments, which will not be repeated here.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 7:
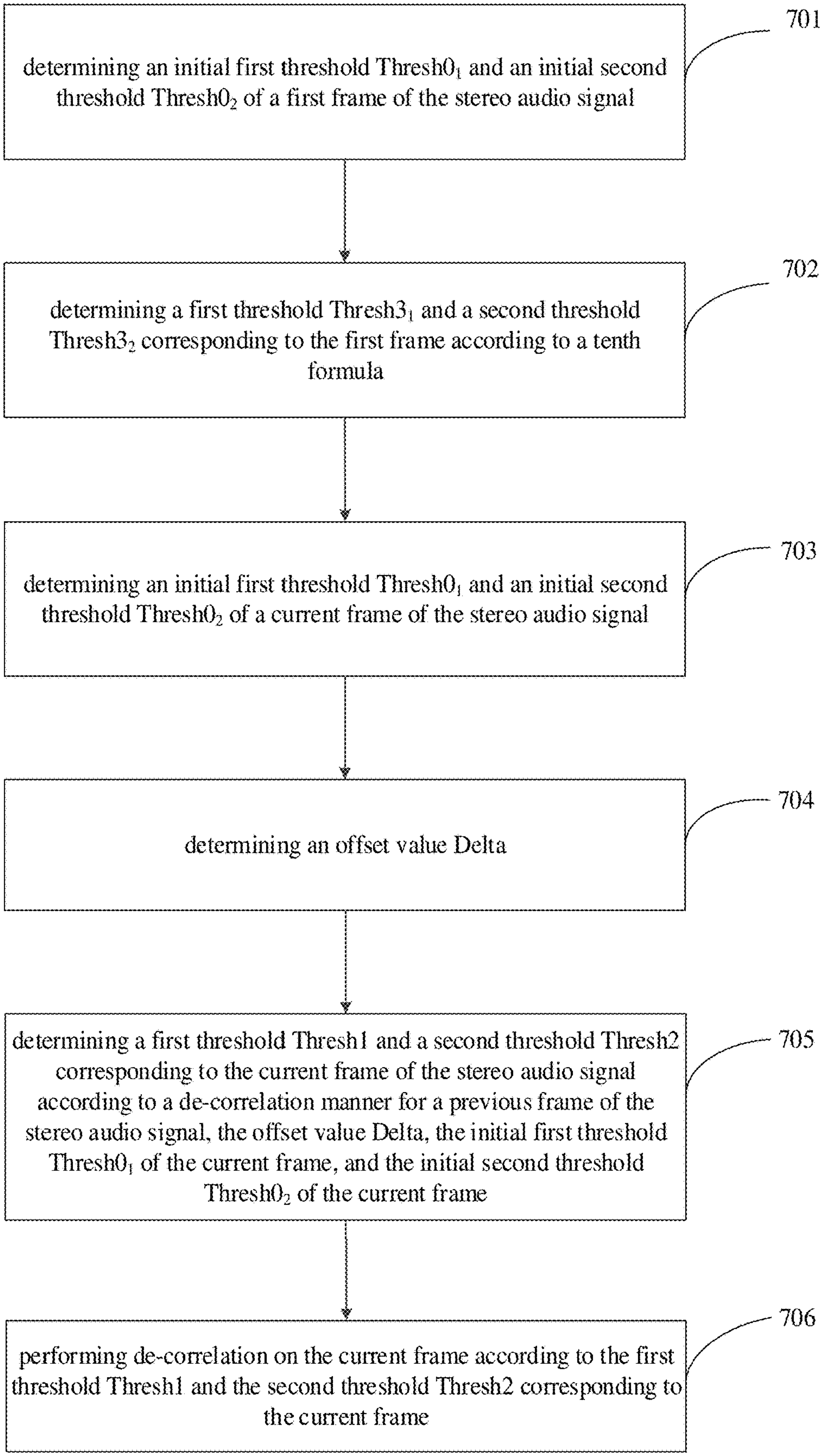
FIG. 7 is a flowchart of a method for processing a stereo audio signal provided by an embodiment of the present disclosure.

FIG. 7 is a flowchart of a method for processing a stereo audio signal provided by an embodiment of the present disclosure. The method is performed by the encoding device. As shown in FIG. 7, the method for processing the stereo audio signal includes the following steps.

In step 701, an initial first threshold $Thresh0_1$ and an initial second threshold $Thresh0_2$ of a first frame of the stereo audio signal are determined.

In step 702, a first threshold $Thresh3_1$ and a second threshold $Thresh3_2$ corresponding to the first frame are determined according to a tenth formula.

In an embodiment of the present disclosure, the tenth formula is:

$$\begin{cases} Thresh3_1 = Thresh0_1 \\ Thresh3_2 = Thresh0_2 \end{cases}$$

where $Thresh3_1$ and $Thresh3_2$ represent a first threshold of the first frame and a second threshold of the first frame respectively, and $Thresh0_1$ and $Thresh0_2$ represent an initial first threshold of the first frame and an initial second threshold of the first frame respectively.

In step 703, an initial first threshold $Thresh0_1$ and an initial second threshold $Thresh0_2$ of a current frame of the stereo audio signal are determined, where $Thresh0_1 \in (-1,0)$, and $Thresh0_2 \in (0,1)$.

In step 704, an offset value Delta is determined.

In step 705, a first threshold Thresh1 and a second threshold Thresh2 corresponding to the current frame of the stereo audio signal are determined according to a de-correlation manner for a previous frame of the stereo audio signal, the offset value Delta, the initial first threshold $Thresh0_1$ of the current frame, and the initial second threshold $Thresh0_2$ of the current frame.

In step 706, de-correlation is performed on the current frame according to the first threshold Thresh1 and the second threshold Thresh2 corresponding to the current frame.

Therefore, in the method for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

Figure 8:
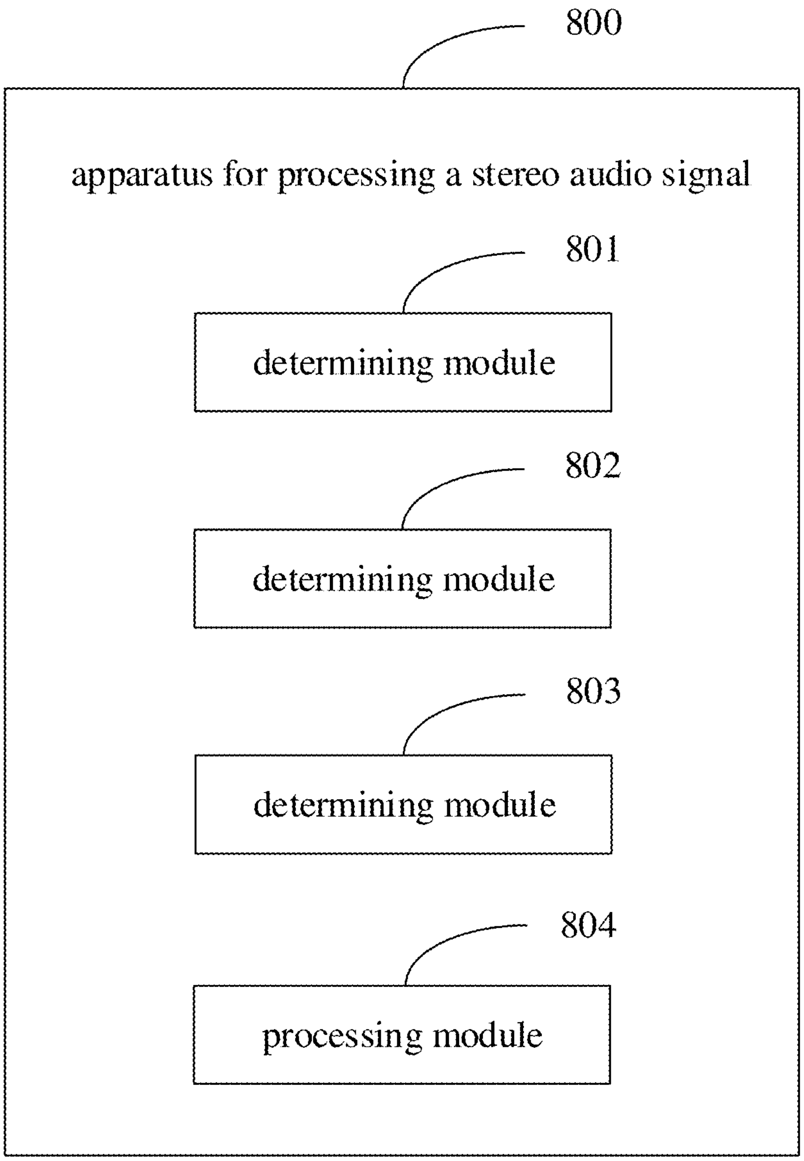
FIG. 8 is a schematic diagram of an apparatus for processing a stereo audio signal provided by an embodiment of the present disclosure.

FIG. 8 is a schematic diagram of an apparatus for processing a stereo audio signal provided by an embodiment of the present disclosure. As shown in FIG. 8, the apparatus 800 includes a determining module 801 configured to determine an initial first threshold $Thresh0_1$ and an initial second threshold $Thresh0_2$ of a current frame of the sterco audio signal, where $Thresh0_1 \in (-1,0)$, and $Thresh0_2 \in (0,1)$; a determining module 802 configured to determine an offset value Delta; a determining module 803 configured to determine a first threshold Thresh1 and a second threshold Thresh2 corresponding to the current frame of the stereo audio signal according to a de-correlation manner for a previous frame of the stereo audio signal, the offset value Delta, the initial first threshold $Thresh0_1$ of the current frame, and the initial second threshold $Thresh0_2$ of the current frame; and a processing module 804 configured to perform de-correlation on the current frame according to the first threshold Thresh1 and the second threshold Thresh2 corresponding to the current frame.

Therefore, in the apparatus for processing the stereo audio signal provided by the embodiments of the present disclosure, the initial first threshold $Thresh0_1$ and the initial second threshold $Thresh0_2$ of the current frame of the stereo audio signal are determined, where $Thresh0_1 \in (-1, 0)$, $Thresh0_2 \in (0, 1)$; the offset value Delta is determined; the first threshold Thresh1 and the second threshold Thresh2 corresponding to the current frame of the stereo audio signal are determined according to the de-correlation manner for the previous frame of the stereo audio signal, the offset value Delta, the initial first threshold $Thresh0_1$ of the current frame, and the initial second threshold $Thresh0_2$ of the current frame; and the de-correlation is performed on the current frame according to the first threshold Thresh1 and the second threshold Thresh2 corresponding to the current frame. In this way, in the embodiments of the present disclosure, the first threshold Thresh1 and the second threshold Thresh2 corresponding to the current frame are adaptively updated in real time according to the de-correlation manner for the previous frame, the accuracy of the correlation determination for each frame is improved, and the optimal de-correlation manner is accurately selected based on the correlation for each frame, thus improving the encoding compression rate.

In an embodiment of the present disclosure, determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame includes: determining the first threshold Thresh1 and the second threshold Thresh2 corresponding to the current frame according to a first formula in response to determining that the de-correlation manner for the previous frame of the stereo audio signal is performing the de-correlation with a first de-correlation manner, where the first formula is:

$$\begin{cases} Thresh1 = Thresh0_1 - \text{Delta} \\ Thresh2 = Thresh0_2 \end{cases}$$

where Thresh1 and Thresh2 represent the first threshold and the second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_1|)$.

In an embodiment of the present disclosure, the determining module 803 is further configured to, determine the first threshold Thresh1 and the second threshold Thresh2 corresponding to the current frame according to a second formula in response to determining that the de-correlation manner for the previous frame of the stereo audio signal is performing the de-correlation with a second de-correlation manner, where the second formula is:

$$\begin{cases} Thresh1 = Thresh0_1 \\ Thresh2 = Thresh0_2 - \text{Delta} \end{cases}$$

where Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_2|)$.

In an embodiment of the present disclosure, the determining module 803 is further configured to, determine the first threshold Thresh1 and the second threshold Thresh2 corresponding to the current frame according to a third formula in response to determining that the de-correlation manner for the previous frame of the stereo audio signal is not performing the de-correlation, and a reason of not performing the de-correlation is that a first cross-correlation coefficient for a left channel signal and a right channel signal of the previous frame is greater than or equal to a first threshold $Thresh2_1$ corresponding to the previous frame and is less than or equal to a second threshold $Thresh2_2$ corresponding to the previous frame, where the third formula is:

$$\begin{cases} Thresh1 = Thresh0_1 \\ Thresh2 = Thresh0_2 \end{cases}$$

where Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively.

In an embodiment of the present disclosure, the determining module 803 is further configured to: determine the first threshold Thresh1 and the second threshold Thresh2 corresponding to the current frame according to a fourth formula in response to determining that the de-correlation manner for the previous frame of the stereo audio signal is not performing the de-correlation, and a reason of not performing the de-correlation is that a first cross-correlation coefficient for a left channel signal and a right channel signal of the previous frame is less than a first threshold $Thresh2_1$ corresponding to the previous frame, and the first cross-correlation coefficient is greater than or equal to a second cross-correlation coefficient, in which the second cross-correlation coefficient is a cross-correlation coefficient for de-correlated signals obtained by performing a first de-correlation on signals of the previous frame with a first de-correlation manner, where the fourth formula is:

$$\begin{cases} Thresh1 = Thresh0_1 - \text{Delta} \\ Thresh2 = Thresh0_2 \end{cases}$$

where Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_1|)$.

In an embodiment of the present disclosure, the determining module 803 is further configured to: determine the first threshold Thresh1 and the second threshold Thresh2 corresponding to the current frame according to a fifth formula in response to determining that the de-correlation manner for the previous frame of the stereo audio signal is not performing the de-correlation, and a reason of not performing the de-correlation is that a first cross-correlation coefficient for a left channel signal and a right channel signal of the previous frame is greater than a second threshold $Thresh2_2$ corresponding to the previous frame, and the first cross-correlation coefficient is less than or equal to a third cross-correlation coefficient, in which the third cross-correlation coefficient is a cross-correlation coefficient for de-correlated signals obtained by performing a second de-correlation on signals of the previous frame with a second de-correlation manner, and the fifth formula is:

$$\begin{cases} Thresh1 = Thresh0_1 \\ Thresh2 = Thresh0_2 + \text{Delta} \end{cases}$$

where Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_2|)$.

In an embodiment of the present disclosure, the first de-correlation manner includes a first Mid/Sid down-mixing processing.

In an embodiment of the present disclosure, the first Mid/Sid down-mixing processing includes: obtaining a Mid-channel signal and a Sid-channel signal by processing the left channel signal and the right channel signal of the previous frame according to a sixth formula, where the sixth formula is:

$$\begin{cases} Mid(n) = \frac{(L(n) - R(n))}{2} \\ Sid(n) = L(n) + R(n) \end{cases}$$

where Mid(n) represents a Mid-channel signal of the previous frame, Sid(n) represents a Sid-channel signal of the previous frame, L(n) represents the left channel signal of the previous frame, and R(n) represents the right channel signal of the previous frame.

In an embodiment of the present disclosure, the second de-correlation manner includes a second Mid/Sid down-mixing processing.

In an embodiment of the present disclosure, the second Mid/Sid down-mixing processing includes: obtaining a Mid-channel signal and a Sid-channel signal by processing the left channel signal and the right channel signal of the previous frame according to a seventh formula, where the seventh formula is:

$$\begin{cases} Mid(n) = \frac{(L(n) + R(n))}{2} \\ Sid(n) = L(n) - R(n) \end{cases}$$

where Mid(n) represents a Mid-channel signal of the previous frame, Sid(n) represents a Sid-channel signal of the previous frame, L(n) represents the left channel signal of the previous frame, and R(n) represents the right channel signal of the previous frame.

In an embodiment of the present disclosure, the apparatus is further configured to determine the first cross-correlation coefficient for the left channel signal and the right channel signal of the previous frame according to an eighth formula of $$\begin{cases} \eta_{(LR)} = \frac{\sum_{n=1}^{N} (L(n) - \overline{L}) \times (R(n) - \overline{R})}{\sqrt{\sum_{n=1}^{N} (L(n) - \overline{L})^2} \times \sqrt{\sum_{n=1}^{N} (R(n) - \overline{R})^2}} \\ \overline{L} = \frac{\sum_{n=1}^{N} L(n)}{N} \\ \overline{R} = \frac{\sum_{n=1}^{N} R(n)}{N} \end{cases}$$

where $\eta_{(LR)}$ represents the first cross-correlation coefficient for the left channel signal and the right channel signal of the previous frame, L(n) represents a $n^{th}$ sample point of the left channel signal of the previous frame, $\overline{L}$ represents an average value of all sample points of the left channel signal of the previous frame, R(n) represents a $n^{th}$ sample point of the right channel signal of the previous frame, $\overline{R}$ represents an average value of all sample points of the right channel signal of the previous frame, N represents a total number of sample points of the left channel signal or the right channel signal of the previous frame, i.e., a frame length of the previous frame.

In an embodiment of the present disclosure, the de-correlated signals include a Mid-channel signal and a Sid-channel signal, and the apparatus is further configured to: determine the second cross-correlation coefficient and the third cross-correlation coefficient for the de-correlated signals according to a ninth formula of $$\begin{cases} \eta_{(MS)} = \dfrac{\sum_{n=1}^{N}\left(Mid(n)-\overline{Mid}\right)\times\left(Sid(n)-\overline{Sid}\right)}{\sqrt{\sum_{n=1}^{N}\left(Mid(n)-\overline{Mid}\right)^2}\times\sqrt{\sum_{n=1}^{N}\left(Sid(n)-\overline{Sid}\right)^2}} \\ \overline{Mid} = \dfrac{\sum_{n=1}^{N}Mid(n)}{N} \\ \overline{Sid} = \dfrac{\sum_{n=1}^{N}Sid(n)}{N} \end{cases}$$

where $\eta_{(MS)}$ represents the second cross-correlation coefficient or the third cross-correlation coefficient, Mid(n) represents a $n^{th}$ sample point of the Mid-channel signal in the de-correlated signals, $\overline{Mid}$ represents an average value of all sample points of the Mid-channel signal in the de-correlated signals, Sid(n) represents a $n^{th}$ sample point of the Sid-channel signal in the de-correlated signals, $\overline{Sid}$ represents an average value of all sample points of the Sid-channel signal in the de-correlated signals, N represents a total number of sample points of the Mid-channel signal or the Sid-channel signal of the previous frame, i.e., a frame length of the previous frame.

In an embodiment of the present disclosure, the apparatus is further configured to: determine an initial first threshold Thresh01 and an initial second threshold Thresh02 of a first frame of the stereo audio signal; and determine a first threshold Thresh31 and a second threshold $Thresh3_2$ corresponding to the first frame according to a tenth formula of $$\begin{cases} Thresh3_1 = Thresh0_1 \\ Thresh3_2 = Thresh0_2 \end{cases}$$

where $Thresh3_1$ and $Thresh3_2$ represent a first threshold of the first frame and a second threshold of the first frame respectively, and $Thresh0_1$ and $Thresh0_2$ represent an initial first threshold of the first frame and an initial second threshold of the first frame respectively.

Figure 9:
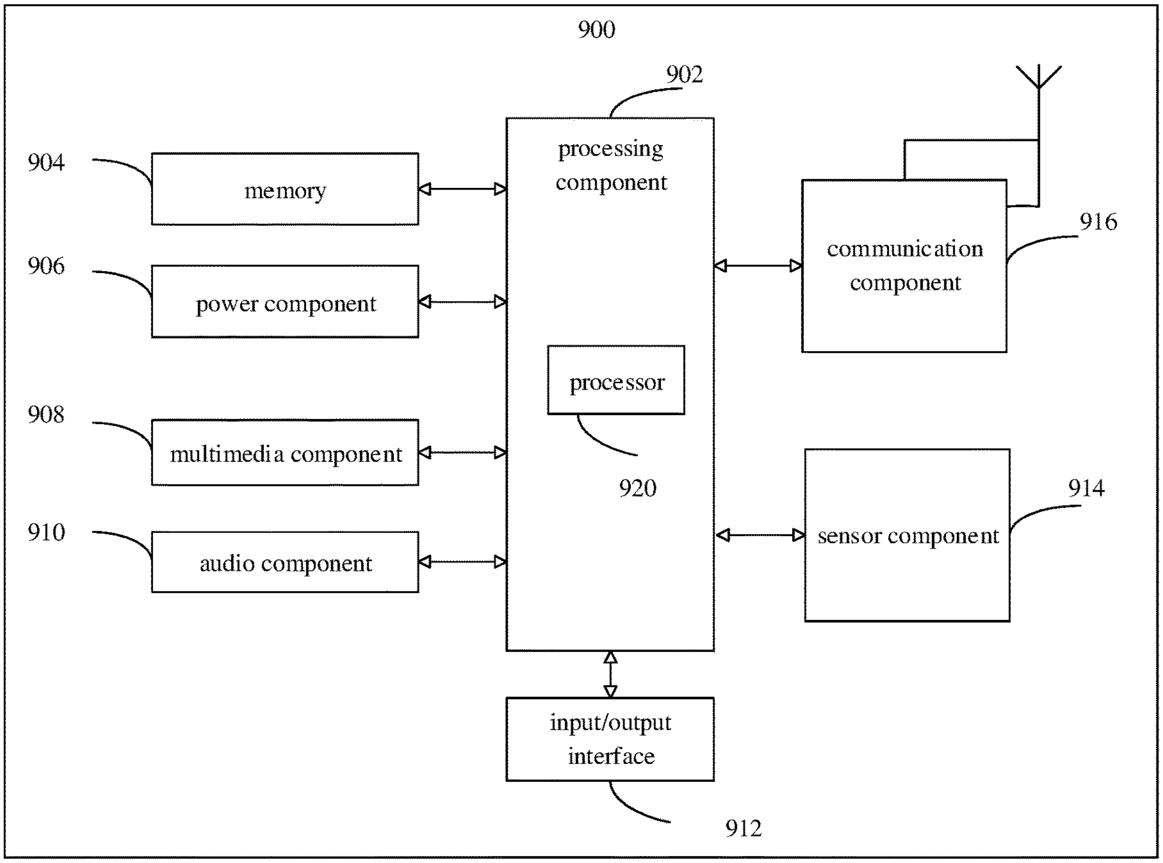
FIG. 9 is a block diagram of a user equipment provided by an embodiment of the present disclosure.

FIG. 9 is a block diagram of a UE 900 provided by an embodiment of the present disclosure. For example, the UE 900 may be a mobile phone, a computer, a digital broadcast terminal device, a messaging device, a game console, a tablet device, a medical device, a fitness device, a personal digital assistant, or the like.

Referring to FIG. 9, the UE 900 may include at least one of the following components: a processing component 902, a memory 904, a power component 906, a multimedia component 908, an audio component 910, an input/output (I/O) interface 912, a sensor component 914, and a communication component 916.

The processing component 902 typically controls overall operations of the UE 900, such as the operations associated with display, phone calls, data communications, camera operations, and recording operations. The processing component 902 may include at least one processors 920 to execute instructions to perform all or some of the steps in the above-described methods. Moreover, the processing component 902 may include at least one modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the UE 900. Examples of such data include instructions for any applications or methods operated on the UE 900, contact data, phonebook data, messages, pictures, videos, etc. The memory 904 may be implemented using any type of volatile or non-volatile memory devices, or a combination thereof, such as a static random access memory (SRAM), an electrically crasable programmable read-only memory (EEPROM), an crasable programmable read-only memory (EPROM), a programmable read-only memory (PROM), a read-only memory (ROM), a magnetic memory, a flash memory, a magnetic or optical disk.

The power component 906 provides power to various components of the UE 900. The power component 906 may include a power management system, at least one power sources, and any other components associated with the generation, management, and distribution of power in the UE 900.

The multimedia component 908 includes a screen providing an output interface between the UE 900 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensors to sense touches, swipes, and gestures on the touch panel. The touch sensors may not only sense a boundary of a touch or swipe action, but also sense a wake-up time and a pressure associated with the touch or swipe action. In some embodiments, the multimedia component 908 includes a front camera and/or a rear camera. The front camera and/or the rear camera may receive an external multimedia datum while the UE 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the UE 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as keyboards, click wheels, buttons, and the like. The buttons may include, but are not limited to, a home button, a volume button, a starting button, and a locking button.

The sensor component 914 includes at least one sensors to provide status assessments of various aspects of the UE 900. For instance, the sensor component 914 may detect an open/closed status of the equipment 900, relative positioning of components, e.g., the display and the keypad, of the UE 900. The sensor component 914 may also detect a change in position of the UE 900 or a component of the UE 900, a presence or absence of user contact with the UE 900, an orientation or an acceleration/deceleration of the UE 900, and a change in temperature of the UE 900. The sensor component 914 may include a proximity sensor configured to detect the presence of nearby objects without any physical contact. The sensor component 914 may further include a light sensor, such as a CMOS or CCD image sensor, for use in imaging applications. In some embodiments, the sensor component 914 may further include an accelerometer sensor, a gyroscope sensor, a magnetic sensor, a pressure sensor, or a temperature sensor.

The communication component 916 is configured to facilitate communication, wired or wireless, between the UE 900 and other devices. The UE 900 can access a wireless network based on a communication standard, such as Wi-Fi, 2G, or 3G, or a combination thereof. In an illustrative embodiment, the communication component 916 receives a broadcast signal or broadcast associated information from an external broadcast management system via a broadcast channel. In an illustrative embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 900 may be implemented with at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above methods.

Figure 10:
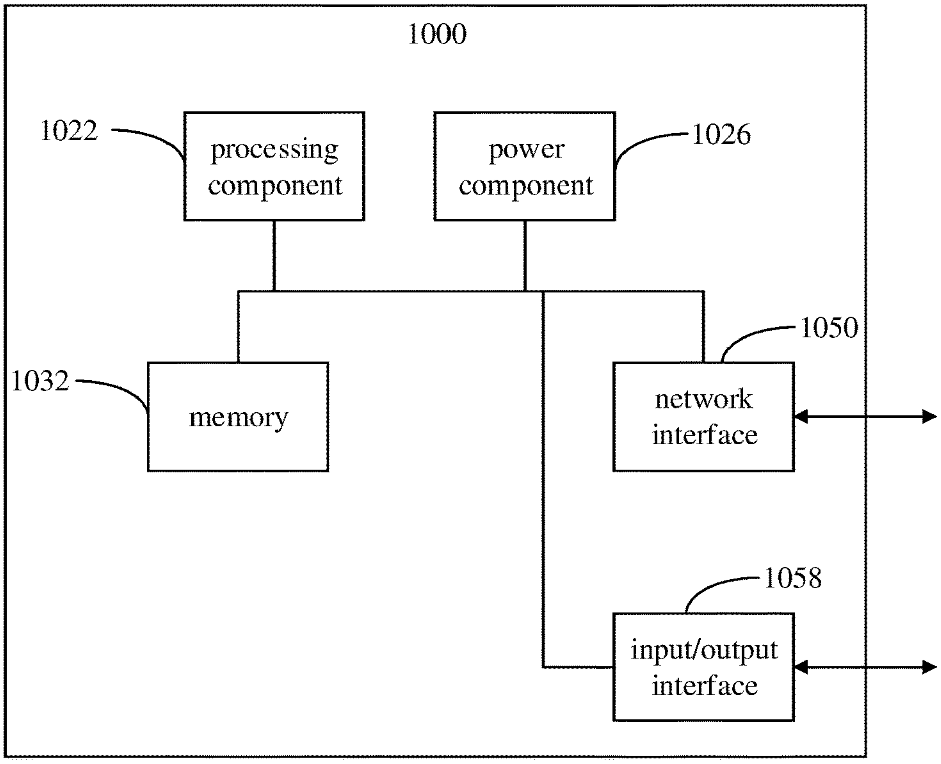
FIG. 10 is a block diagram of a network side device provided by an embodiment of the present disclosure.

FIG. 10 is a block diagram of a network side device 1000 provided by an embodiment of the present disclosure. For example, the network side device 1000 may be provided as a network side device. Referring to FIG. 10, the network side device 1000 includes a processing component 1011, which further includes at least one of processors, and a memory resource represented by a memory 1032 configured to store instructions executable by the processing component 1022, such as application programs. The application programs stored in the memory 1032 may include one or more modules each corresponding to a set of instructions. In addition, the processing component 1010 is configured to execute instructions to perform any of the foregoing methods performed by the network side device, for example, the method shown in FIG. 1.

The network side device 1000 may also include a power component 1026 configured to perform the power management of the network side device 1000, a wired or wireless network interfaces 1050 configured to connect the network side device 1000 to a network, and an input/output (I/O) interface 1058. The network side device 1000 may operate based on an operating system stored in the memory 1032, such as Windows Server™, Mac OS X™, Unix™, Linux™, Free BSD™, or the like.

In the above embodiments provided by the present disclosure, the methods provided in embodiments of the present disclosure are introduced from perspectives of the network side device and the UE respectively. In order to implement the various functions in the methods provided by the above embodiments of the present disclosure, the network side device and the UE may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Embodiments of the present disclosure provide a communication apparatus, which may include a transceiving module and a processing module. The transceiving module may include a sending module and/or a receiving module, the sending module is configured to implement a sending function, and the receiving module is configured to implement a receiving function. The transceiving module may implement the sending function and/or the receiving function.

The communication apparatus may be a terminal device (such as the terminal device in the foregoing method embodiments), may also be an apparatus in the terminal device, and may also be an apparatus that can be used in conjunction with the terminal device. Alternatively, the communication apparatus may be a network device, may also be an apparatus in the network device, and may also be an apparatus that can be used in conjunction with the network device.

Embodiments of the present disclosure provide a communication device, which may be a network device, may also be a terminal device (such as the terminal device in the foregoing method embodiments), may also be a chip, a chip system, or a processor that supports the network device to implement the above methods, and may also be a chip, a chip system, or a processor that supports the terminal device to implement the above methods. The device may be configured to implement the methods as described in the above method embodiments, and for details, reference may be made to the descriptions in the above method embodiments.

The communications device may include one or more processors. The processor may be a general-purpose processor or a special-purpose processor. For example, it may be a baseband processor or a central processing unit. The baseband processor may be configured to process a communication protocol and communication data, and the central processing unit may be configured to control a communication device (such as a network side device, a baseband chip, a terminal device, a terminal device chip, a DU or a CU, etc.), execute computer programs, and process data of the computer programs.

In some embodiments, the communication device may further include one or more memories having stored therein a computer program. The processor executes the computer program, to cause the communication device to implement the methods as described in the above method embodiments. In some embodiments, the memory may have stored therein data. The communication device and the memory may be provided separately or integrated together.

In some embodiments, the communication device may further include a transceiver and an antenna. The transceiver may be called a transceiving element, a transceiving machine, a transceiving circuit or the like, for implementing a transceiving function. The transceiver may include a receiver and a transmitter. The receiver may be called a receiving machine, a receiving circuit or the like, for implementing a receiving function. The transmitter may be called a sending machine, a sending circuit or the like, for implementing a sending function.

In some embodiments, the communication device may further include one or more interface circuits. The interface circuit is configured to receive a code instruction and transmit the code instruction to the processor. The processor runs the code instruction to enable the communication device to execute the methods as described in the above method embodiments.

In an implementation, the processor may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read or write codes/data, or the above transceiving circuit, interface or interface circuit may be configured to transmit or transfer signals.

In an implementation, the processor may have stored therein a computer program that, when run on the processor, causes the communication device to implement the methods as described in the above method embodiments. The computer program may be embedded in the processor, and in this case, the processor may be implemented by a hardware.

In an implementation, the communication device may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), an N-type metal-oxide-semiconductor (NMOS), a P-type metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device (such as the terminal device in the foregoing method embodiments), but the scope of the communication device described in the present disclosure is not limited thereto, and the structure of the communication device may not be limited thereto. The communication device may be a standalone device or may be a part of a larger device. For example, the communication device may be: (1) a standalone integrated circuit (IC), or a chip, or a chip system or subsystem; (2) a set of one or more ICs, for example, the set of ICs may also include a storage component for storing data and computer programs; (3) an ASIC, such as a modem; (4) a module that may be embedded in other devices; (5) a receiver, a terminal device, an intelligent terminal device, a cellular phone, a wireless device, a handheld machine, a mobile unit, a vehicle device, a network device, a cloud device, an artificial intelligence device, etc.; (6) others.

For the case where the communication device may be a chip or a chip system, the chip includes a processor and an interface. In the chip, one or more processors may be provided, and more than one interface may be provided.

In some embodiments, the chip further includes a memory for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such an implementation should not be understood as extending beyond the protection scope of embodiments of the present disclosure.

Embodiments of the present disclosure also provide a system for determining a duration of a side link. The system includes the communication apparatus as the terminal device (such as the first terminal device in the foregoing method embodiments) and the communication apparatus as the network device as described in the foregoing embodiments, or the system includes the communication device as the terminal device (such as the first terminal device in the foregoing method embodiments) and the communication device as the network device as described in the foregoing embodiments.

The present disclosure further provides a readable storage medium having stored thereon instructions that, when executed by a computer, cause functions of any of the above method embodiments to be implemented.

The present disclosure further provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or some of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website, computer, server or data center in a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)), etc.

Those of ordinary skill in the art can understand that the first, second, and other numeral numbers involved in the present disclosure are distinguished only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of priority and have no order of size.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for processing a stereo audio signal, performed by an encoding device, comprising:

determining an initial first threshold $Thresh0_1$ and an initial second threshold $Thresh0_2$ of a current frame of the stereo audio signal, wherein $Thresh0_1 \in (-1,0)$, and $Thresh0_2 \in (0,1)$;

determining an offset value Delta;

determining a first threshold Thresh1 and a second threshold Thresh2 corresponding to the current frame of the stereo audio signal according to a de-correlation manner for a previous frame of the stereo audio signal, the offset value Delta, the initial first threshold $Thresh0_1$ of the current frame, and the initial second threshold $Thresh0_2$ of the current frame; and performing de-correlation on the current frame according to the first threshold Thresh1 and the second threshold Thresh2 corresponding to the current frame;

wherein determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame comprises:

determining the first threshold Thresh1 and the second threshold Thresh2 corresponding to the current frame according to a first formula, wherein the de-correlation manner for the previous frame of the stereo audio signal is performing the de-correlation with a first de-correlation manner, wherein the first formula is:

$$\begin{cases} Thresh1 = Thresh0_1 + \text{Delta} \\ Thresh2 = Thresh0_2 \end{cases}$$

wherein Thresh1 and Thresh2 represent the first threshold and the second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_1|)$.

2. The method of claim 1, wherein determining the first threshold Thresh1 and the second threshold Thresh2 corresponding to the current frame of the stereo audio signal according to the de-correlation manner for the previous frame of the stereo audio signal, the offset value Delta, the initial first threshold Thresh01 of the current frame, and the initial second threshold $Thresh0_2$ of the current frame comprises:

determining the first threshold Thresh1 and the second threshold Thresh2 corresponding to the current frame according to a second formula, wherein de-correlation manner for the previous frame of the stereo audio signal is performing the de-correlation with a second de-correlation manner, wherein the second formula is:

$$\begin{cases} Thresh1 = Thresh0_1 \\ Thresh2 = Thresh0_2 - \text{Delta} \end{cases}$$

wherein Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_2|)$.

3. The method of claim 2, wherein the second de-correlation manner comprises a second Mid/Sid down-mixing processing comprising:

obtaining a Mid-channel signal and a Sid-channel signal by processing a left channel signal and a right channel signal of the previous frame according to a seventh formula, wherein the seventh formula is:

$$\begin{cases} \text{Mid}(n) = \dfrac{(L(n) - R(n))}{2} \\ \text{Sid}(n) = L(n) - R(n) \end{cases}$$

wherein Mid(n) represents a Mid-channel signal of the previous frame, Sid(n) represents a Sid-channel signal of the previous frame, L(n) represents the left channel signal of the previous frame, and R(n) represents the right channel signal of the previous frame.

4. The method of claim 1, wherein determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame comprises:

determining the first threshold Thresh1 and the second threshold Thresh2 corresponding to the current frame according to a third formula, wherein the de-correlation manner for the previous frame of the stereo audio signal is not performing the de- correlation, and a reason of not performing the de-correlation is that a first cross-correlation coefficient for a left channel signal and a right channel signal of the previous frame is greater than or equal to a first threshold $Thresh2_1$ corresponding to the previous frame and is less than or equal to a second threshold $Thresh2_2$ corresponding to the previous frame, wherein the third formula is:

$$\begin{cases} Thresh1 = Thresh0_1 \\ Thresh2 = Thresh0_2 \end{cases}$$

wherein Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively.

5. The method of claim 4, wherein determining the first cross-correlation coefficient comprises:

determining the first cross-correlation coefficient for the left channel signal and the right channel signal of the previous frame according to an eighth formula of $$\begin{cases} \eta_{(LR)} = \dfrac{\sum_{n=1}^{N}(L(n)-\overline{L})\times(R(n)-\overline{R})}{\sqrt{\sum_{n=1}^{N}(L(n)-\overline{L})^2}\times\sqrt{\sum_{n=1}^{N}(R(n)-\overline{R})^2}} \\ \overline{L} = \dfrac{\sum_{n=1}^{N}L(n)}{N} \\ \overline{R} = \dfrac{\sum_{n=1}^{N}R(n)}{N} \end{cases}$$

wherein $\eta_{(LR)}$ represents the first cross-correlation coefficient for the left channel signal and the right channel signal of the previous frame, L(n) represents a $n^{th}$ sample point of the left channel signal of the previous frame, $\overline{L}$ represents an average value of all sample points of the left channel signal of the previous frame, R(n) represents a $n^{th}$ sample point of the right channel signal of the previous frame, $\overline{R}$ represents an average value of all sample points of the right channel signal of the previous frame, N represents a total number of sample points of the left channel signal or the right channel signal of the previous frame.

6. The method of claim 1, wherein determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame comprises:

determining the first threshold Thresh1 and the second threshold Thresh2 corresponding to the current frame according to a fourth formula, wherein the de-correlation manner for the previous frame of the stereo audio signal is not performing the de-correlation, a reason of not performing the de-correlation is that a first cross-correlation coefficient for a left channel signal and a right channel signal of the previous frame is less than a first threshold $Thresh2_1$ corresponding to the previous frame, and the first cross-correlation coefficient is greater than or equal to a second cross-correlation coefficient, wherein the second cross-correlation coefficient is a cross-correlation coefficient for de-correlated signals obtained by performing a first de-correlation on signals of the previous frame with a first de-correlation manner, wherein the fourth formula is:

$$\begin{cases} Thresh1 = Thresh0_1 - \text{Delta} \\ Thresh2 = Thresh0_2 \end{cases}$$

wherein Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively, and Delta represents an offset value, and Delta$\in(0, |Thresh0_1|)$.

7. The method of claim 6, wherein the first de-correlation manner comprises a first Mid/Sid down-mixing processing comprises:

obtaining a Mid-channel signal and a Sid-channel signal by processing the left channel signal and the right channel signal of the previous frame according to a sixth formula, wherein the sixth formula is:

$$\begin{cases} \text{Mid}(n) = \dfrac{(L(n)-R(n))}{2} \\ \text{Sid}(n) = L(n)+R(n) \end{cases}$$

wherein Mid(n) represents a Mid-channel signal of the previous frame, Sid(n) represents a Sid-channel signal of the previous frame, L(n) represents the left channel signal of the previous frame, and R(n) represents the right channel signal of the previous frame.

8. The method of claim 6, wherein the de-correlated signals comprise a Mid-channel signal and a Sid-channel signal, and calculating the second cross-correlation coefficient for the de-correlated signals comprises:

determining the second cross-correlation coefficient for the de-correlated signals according to a ninth formula of $$\begin{cases} \eta_{(MS)} = \dfrac{\sum_{n=1}^{N}(\text{Mid}(n)-\overline{M_1d})\times(\text{Sid}(n)-\overline{S_1d})}{\sqrt{\sum_{n=1}^{N}(\text{Mid}(n)-\overline{M_1d})^2}\times\sqrt{\sum_{n=1}^{N}(\text{Sid}(n)-\overline{S_1d})^2}} \\ \overline{M_1d} = \dfrac{\sum_{n=1}^{N}\text{Mid}(n)}{N} \\ \overline{S_1d} = \dfrac{\sum_{n=1}^{N}S_1d(n)}{N} \end{cases}$$

wherein $\eta_{(MS)}$ represents the second cross-correlation coefficient, Mid(n) represents a $n^{th}$ sample point of the Mid-channel signal in the de-correlated signals, Mid represents an average value of all sample points of the Mid-channel signal in the de-correlated signals, Sid(n) represents a $n^{th}$ sample point of the Sid-channel signal in the de-correlated signals, $\overline{\text{Sid}}$ represents an average value of all sample points of the Sid-channel signal in the de-correlated signals, N represents a total number of sample points of the Mid-channel signal or the Sid-channel signal of the previous frame.

9. The method of claim 6, wherein determining the first cross-correlation coefficient comprises:

determining the first cross-correlation coefficient for the left channel signal and the right channel signal of the previous frame according to an eighth formula of $$\begin{cases} \eta_{(LR)} = \dfrac{\sum_{n=1}^{N}(L(n)-\overline{L})\times(R(n)-\overline{R})}{\sqrt{\sum_{n=1}^{N}(L(n)-\overline{L})^2}\times\sqrt{\sum_{n=1}^{N}(R(n)-\overline{R})^2}} \\ \overline{L} = \dfrac{\sum_{n=1}^{N}L(n)}{N} \\ \overline{R} = \dfrac{\sum_{n=1}^{N}R(n)}{N} \end{cases}$$

wherein $\eta_{(LR)}$ represents the first cross-correlation coefficient for the left channel signal and the right channel signal of the previous frame, L(n) represents a $n^{th}$ sample point of the left channel signal of the previous frame, $\overline{L}$ represents an average value of all sample points of the left channel signal of the previous frame, R(n) represents a $n^{th}$ sample point of the right channel signal of the previous frame, $\overline{R}$ represents an average value of all sample points of the right channel signal of the previous frame, N represents a total number of sample points of the left channel signal or the right channel signal of the previous frame.

10. The method of claim 1, wherein determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame comprises:

determining the first threshold Thresh1 and the second threshold Thresh2 corresponding to the current frame according to a fifth formula, wherein the de-correlation manner for the previous frame of the stereo audio signal is not performing the de-correlation, and a reason of not performing the de-correlation is that a first cross-correlation coefficient for a left channel signal and a right channel signal of the previous frame is greater than a second threshold $Thresh2_2$ corresponding to the previous frame, and the first cross- correlation coefficient is less than or equal to a third cross-correlation coefficient, wherein the third cross-correlation coefficient is a cross-correlation coefficient for de-correlated signals obtained by performing a second de-correlation on signals of the previous frame with a second de-correlation manner, wherein the fifth formula is:

$$\begin{cases} Thresh1 = Thresh0_1 \\ Thresh2 = Thresh0_2 + \text{Delta} \end{cases}$$

wherein Thresh1 and Thresh2 represent a first threshold of the current frame and a second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_2|)$.

11. The method of claim 10, wherein the second de-correlation manner comprises a second Mid/Sid down-mixing processing comprising:

obtaining a Mid-channel signal and a Sid-channel signal by processing the left channel signal and the right channel signal of the previous frame according to a seventh formula, wherein the seventh formula is:

$$\begin{cases} \text{Mid}(n) = \dfrac{(L(n) - R(n))}{2} \\ \text{Sid}(n) = L(n) - R(n) \end{cases}$$

wherein Mid(n) represents a Mid-channel signal of the previous frame, Sid(n) represents a Sid-channel signal of the previous frame, L(n) represents the left channel signal of the previous frame, and R(n) represents the right channel signal of the previous frame.

12. The method of claim 10, wherein determining the first cross-correlation coefficient comprises:

determining the first cross-correlation coefficient for the left channel signal and the right channel signal of the previous frame according to an eighth formula of $$\begin{cases} \eta_{(LR)} = \dfrac{\sum_{n=1}^{N}(L(n)-\overline{L})\times(R(n)-\overline{R})}{\sqrt{\sum_{n=1}^{N}(L(n)-\overline{L})^2}\times\sqrt{\sum_{n=1}^{N}(R(n)-\overline{R})^2}} \\ \overline{L} = \dfrac{\sum_{n=1}^{N}L(n)}{N} \\ \overline{R} = \dfrac{\sum_{n=1}^{N}R(n)}{N} \end{cases}$$

wherein $\eta_{(LR)}$ represents the first cross-correlation coefficient for the left channel signal and the right channel signal of the previous frame, L(n) represents a $n^{th}$ sample point of the left channel signal of the previous frame, $\overline{L}$ represents an average value of all sample points of the left channel signal of the previous frame, R(n) represents a $n^{th}$ sample point of the right channel signal of the previous frame, $\overline{R}$ represents an average value of all sample points of the right channel signal of the previous frame, N represents a total number of sample points of the left channel signal or the right channel signal of the previous frame.

13. The method of claim 10, wherein the de-correlated signals comprise a Mid-channel signal and a Sid-channel signal, and calculating the third cross-correlation coefficient for the de-correlated signals comprises:

determining the third cross-correlation coefficient for the de-correlated signals according to a ninth formula of <CWU-Call number = "57" />

$$\begin{cases} \eta_{(MS)} = \dfrac{\sum_{n=1}^{N}(\text{Mid}(n)-\overline{M_id})\times(\text{Sid}(n)-\overline{S_id})}{\sqrt{\sum_{n=1}^{N}(\text{Mid}(n)-\overline{M_id})^2}\times\sqrt{\sum_{n=1}^{N}(\text{Sid}(n)-\overline{S_id})^2}} \\ \overline{M_id} = \dfrac{\sum_{n=1}^{N}\text{Mid}(n)}{N} \\ \overline{S_id} = \dfrac{\sum_{n=1}^{N}S_id(n)}{N} \end{cases}$$

wherein $\eta_{(MS)}$ represents the third cross-correlation coefficient, Mid(n) represents a $n^{th}$ sample point of the Mid-channel signal in the de-correlated signals, $\overline{\text{Mid}}$ represents an average value of all sample points of the Mid-channel signal in the de-correlated signals, Sid(n) represents a $n^{th}$ sample point of the Sid-channel signal in the de-correlated signals, $\overline{\text{Sid}}$ represents an average value of all sample points of the Sid-channel signal in the de-correlated signals, N represents a total number of sample points of the Mid-channel signal or the Sid-channel signal of the previous frame.

14. The method of claim 1, wherein the first de-correlation manner comprises a first Mid/Sid down-mixing processing comprising:

obtaining a Mid-channel signal and a Sid-channel signal by processing a left channel signal and a right channel signal of the previous frame according to a sixth formula, wherein the sixth formula is:

$$\begin{cases} \text{Mid}(n) = \dfrac{(L(n) - R(n))}{2} \\ \text{Sid}(n) = L(n) + R(n) \end{cases}$$

wherein Mid(n) represents a Mid-channel signal of the previous frame, Sid(n) represents a Sid-channel signal of the previous frame, L(n) represents the left channel signal of the previous frame, and R(n) represents the right channel signal of the previous frame.

15. The method of claim 1, further comprising:

determining an initial first threshold $Thresh0_1$ and an initial second threshold $Thresh0_2$ of a first frame of the stereo audio signal; and determining a first threshold $Thresh3_1$ and a second threshold $Thresh3_2$ corresponding to the first frame according to a tenth formula of $$\begin{cases} Thresh3_1 = Thresh0_1 \\ Thresh3_2 = Thresh0_2 \end{cases}$$

wherein $Thresh3_1$ and $Thresh3_2$ represent a first threshold of the first frame and a second threshold of the first frame respectively, and $Thresh0_1$ and $Thresh0_2$ represent an initial first threshold of the first frame and an initial second threshold of the first frame respectively.

16. An encoding device, comprising:

a processor; and a memory having stored therein a computer program that, when executed by the processor, causes the encoding device to implement:

determining an initial first threshold Thresh01 and an initial second threshold $Thresh0_2$ of a current frame of a stereo audio signal, wherein $Thresh0_1 \in (-1,0)$, and $Thresh0_2 \in (0,1)$;

determining an offset value Delta;

determining a first threshold Thresh1 and a second threshold Thresh2 corresponding to the current frame of the stereo audio signal according to a de-correlation manner for a previous frame of the stereo audio signal, the offset value Delta, the initial first threshold $Thresh0_1$ of the current frame, and the initial second threshold $Thresh0_2$ of the current frame; and performing de-correlation on the current frame according to the first threshold Thresh1 and the second threshold Thresh2 corresponding to the current frame;

wherein determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame comprises:

determining the first threshold Thresh1 and the second threshold Thresh2 corresponding to the current frame according to a first formula, wherein the de-correlation manner for the previous frame of the stereo audio signal is performing the de-correlation with a first de-correlation manner, wherein the first formula is:

$$\begin{cases} Thresh1 = Thresh0_1 + \text{Delta} \\ Thresh2 = Thresh0_2 \end{cases}$$

wherein Thresh1 and Thresh2 represent the first threshold and the second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_1|)$.

17. An encoding device, comprising a processor and an interface circuit;

wherein the interface circuit is configured to receive a code instruction and transmit the code instruction to the processor; and the processor is configured to run the code instruction to implement:

determining an initial first threshold $Thresh0_1$ and an initial second threshold $Thresh0_2$ of a current frame of a stereo audio signal, wherein $Thresh0_1 \in (-1,0)$, and $Thresh0_2 \in (0,1)$;

determining an offset value Delta;

determining a first threshold Thresh1 and a second threshold Thresh2 corresponding to the current frame of the stereo audio signal according to a de-correlation manner for a previous frame of the stereo audio signal, the offset value Delta, the initial first threshold $Thresh0_1$ of the current frame, and the initial second threshold $Thresh0_2$ of the current frame; and performing de-correlation on the current frame according to the first threshold Thresh1 and the second threshold Thresh2 corresponding to the current frame;

wherein determining the first threshold Thresh1 and the second threshold Thresh2 corresponding to the current frame of the stereo audio signal according to the de-correlation manner for the previous frame of the stereo audio signal, the offset value Delta, the initial first threshold $Thresh0_1$ of the current frame, and the initial second threshold $Thresh0_2$ of the current frame comprises:

determining the first threshold Thresh1 and the second threshold Thresh2 corresponding to the current frame according to a first formula, wherein the de-correlation manner for the previous frame of the stereo audio signal is performing the de-correlation with a first de-correlation manner, wherein the first formula is:

$$\begin{cases} Thresh1 = Thresh0_1 + \text{Delta} \\ Thresh2 = Thresh0_2 \end{cases}$$

wherein Thresh1 and Thresh2 represent the first threshold and the second threshold of the current frame respectively, $Thresh0_1$ and $Thresh0_2$ represent the initial first threshold of the current frame and the initial second threshold of the current frame respectively, and Delta represents an offset value, and $\text{Delta} \in (0, |Thresh0_1|)$.

18. A non-transitory computer-readable storage medium having stored therein instructions that, when executed, cause the method of claim 1 to be implemented.

* * * * *